(12) United States Patent
Rubin et al.

(10) Patent No.: US 12,461,101 B2
(45) Date of Patent: Nov. 4, 2025

(54) BLOOD-BASED SIGNATURES FOR DIAGNOSIS AND SUB-TYPING OF INFLAMMATORY BOWEL DISEASE SUBSETS

(71) Applicant: The Board of Trustees of the Leland Stanford Junior University, Stanford, CA (US)

(72) Inventors: Samuel J. Rubin, Stanford, CA (US); Aida Habtezion, Stanford, CA (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 1098 days.

(21) Appl. No.: 17/296,941

(22) PCT Filed: Dec. 20, 2019

(86) PCT No.: PCT/US2019/067989
§ 371 (c)(1),
(2) Date: May 25, 2021

(87) PCT Pub. No.: WO2020/142276
PCT Pub. Date: Jul. 9, 2020

(65) Prior Publication Data
US 2021/0396753 A1    Dec. 23, 2021

Related U.S. Application Data

(60) Provisional application No. 62/787,977, filed on Jan. 3, 2019.

(51) Int. Cl.
| | | |
|---|---|---|
| *G01N 33/569* | (2006.01) | |
| *C12Q 1/6883* | (2018.01) | |
| *G01N 1/30* | (2006.01) | |
| *G01N 33/68* | (2006.01) | |

(52) U.S. Cl.
CPC ..... *G01N 33/56972* (2013.01); *C12Q 1/6883* (2013.01); *G01N 1/30* (2013.01); *G01N 33/6893* (2013.01); *G01N 2001/302* (2013.01); *G01N 2800/065* (2013.01)

(58) Field of Classification Search
None
See application file for complete search history.

(56) References Cited

U.S. PATENT DOCUMENTS

| | | |
|---|---|---|
| 2013/0344508 A1 | 12/2013 | Schwartz et al. |
| 2017/0035808 A1 | 2/2017 | Jarvis et al. |

OTHER PUBLICATIONS

Adamczyk et al., JCI Insight. 2017; 2(8): e90585 (Year: 2017).*
Bandura et al., Analytical Chemistry 2009 81 6813-6822 (Year: 2009).*
Evans-Marin et al., "Gut Homing Molecule Regulation of the Pathogenesis and Treatment of Inflammatory Bowel Diseases", Inflammation & Allergy—Drug Targets, 2015, 14: 4-12.
Rubin et al., "Mass cytometry reveals systemic and local immune signatures that distinguish inflammatory bowel diseases", Nature Communications, Jun. 19, 2019, 10: 2686, 14 pages.

* cited by examiner

*Primary Examiner* — Christina M Borgeest
(74) *Attorney, Agent, or Firm* — James S. Keddie; Bozicevic, Field & Francis LLP

(57) ABSTRACT

This disclosure provides a method for analyzing peripheral blood leukocytes. In some embodiments, method may comprise: (a) labeling peripheral blood leukocytes isolated from a patient that has or is suspected of having inflammatory bowel disease (IBD) with a panel of distinguishably-labeled antibodies and (b) analyzing binding of the antibodies to the peripheral blood leukocytes. Kits for performing the method are also provided. Results from the analysis can be used to make a diagnosis of Crohn's disease or ulcerative colitis.

20 Claims, 17 Drawing Sheets

FIG 1A
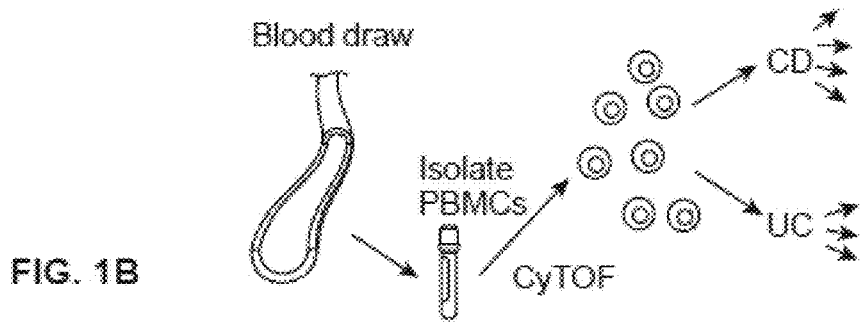
FIG. 1B
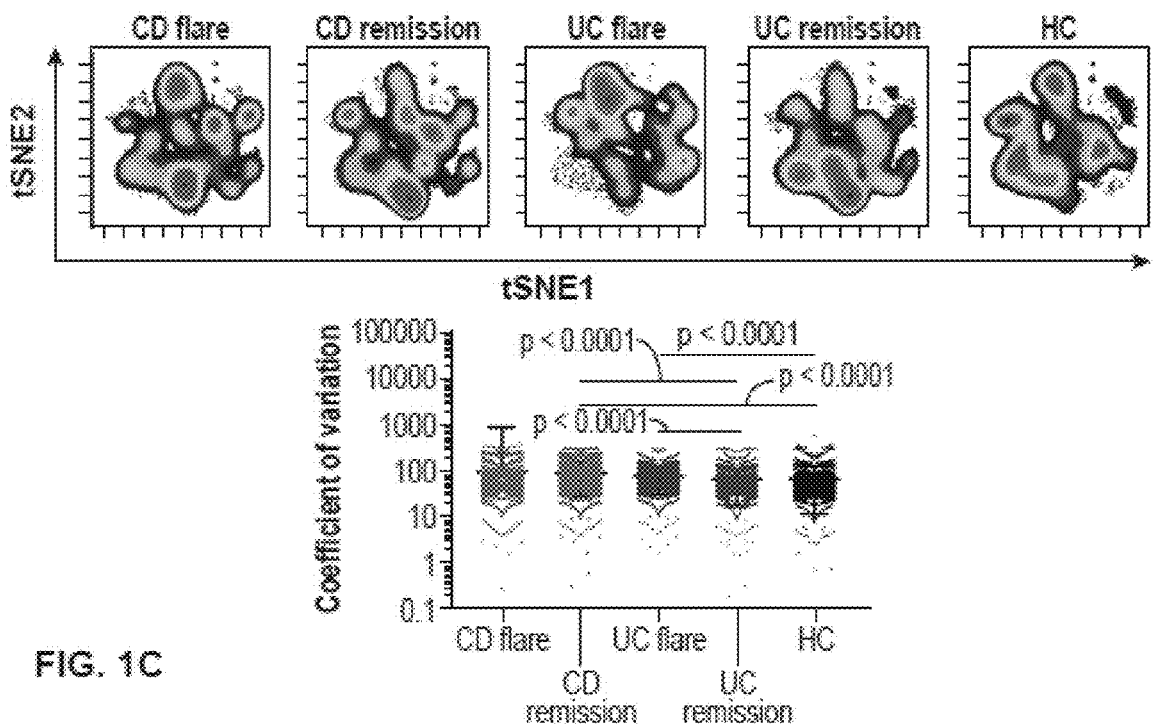
FIG. 1C
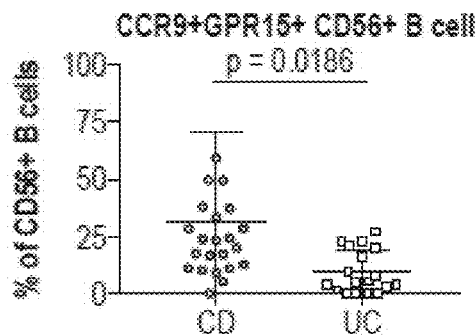
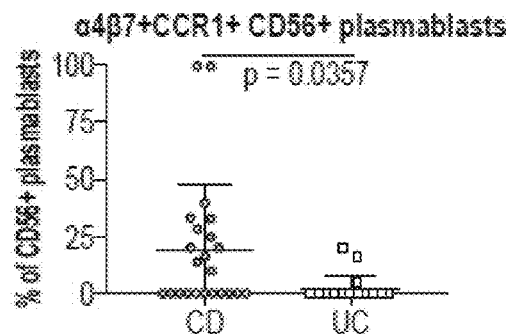

FIG. 4B

| Cell subset | Metric | Higher in | p-value | t-statistic |
|---|---|---|---|---|
| CD14+ cells | % of non-basophils | CD tissue | 0.0138 | 3.16 |
| CD14+ DCs | % of DCs | CD tissue | 0.0350 | 4.24 |
| CD14-CD11c+HLA-DR+CD19+ | Median pSTAT1 | CD tissue | 0.0444 | 3.07 |
| CCR1+CCR9+ DCs | % of DCs | CD tissue | 0.0330 | 3.34 |
| CCR1+GPR15+ DCs | % of DCs | CD tissue | 0.0477 | 3.65 |
| CD38+ NK cells | Median pCREB | CD tissue | 0.0214 | 4.29 |
| CD25+ NKT cells | Median pSTAT3 | CD tissue | 0.0138 | 3.27 |
| Effector memory CD4 T cells | Median pSTAT3 | CD tissue | 0.0286 | 3.38 |
| Effector memory CD8 T cells | Median pSTAT3 | CD tissue | 0.0444 | 3.01 |
| α4β7+GPr15+ effector memory CD8 T cells | % of effector memory CD8 T cells | UC tissue | 0.0214 | -4.43 |
| IgD-CD27- B cells | Median CD25 | CD tissue | 0.0421 | 3.32 |
| CD38+ switched memory B cells | % of switched memory B cells | UC tissue | 0.0214 | -4.22 |
| CXCR5+ switched memory B cells | % of switched memory B cells | CD tissue | 0.0214 | 2.51 |
| CCR1+ IgD+ CXCR5+ B2 cells | % of IgD+ CXCR5+ B2 cells | CD tissue | 0.0477 | 3.23 |
| Plasmablasts | Median pSTAT3 | CD tissue | 0.0138 | 3.49 |
| CCR9+GPR15+ IgD+ plasmablasts | % of IgD+ plasmablasts | UC tissue | 0.0214 | -2.70 |

FIG. 4C

| Cell subset | Metric | Higher in | p-value | t-statistic |
|---|---|---|---|---|
| DCs | Median pSTAT3 | CD inflamed tissue | 0.0394 | 3.40 |
| α4β7+CCR1+GPR15+ DCs | % of α4β7+ DCs | CD inflamed tissue | 0.0106 | 3.18 |
| CD25+ NK cells | Median CCR9 | CD inflamed tissue | 0.0106 | 3.19 |
| Naïve CD4 T cells | Median pSTAT3 | CD inflamed tissue | 0.0106 | 2.87 |
| Effector CD4 T cells | Median pSTAT3 | CD inflamed tissue | 0.0280 | 3.41 |
| CXCR5-PD-1-CD45RO+ CD4 T cells | % of CD45RO+ CD4 T cells | CD inflamed tissue | 0.0155 | 4.96 |
| GPR15+ PD-1+ B cells | % of PD-1+ B cells | CD inflamed tissue | 0.0482 | 2.78 |
| CCR9+ CD45RO+ B cells | % of CD45RO+ B cells | CD inflamed tissue | 0.0056 | 9.67 |
| GPR15+ CD45RO+ B cells | % of CD45RO+ B cells | CD inflamed tissue | 0.0056 | 11.20 |
| CCR9+GPR15+ CD45RO+ B cells | % of CD45RO+ B cells | CD inflamed tissue | 0.0056 | 8.34 |
| CD25+CD19+CD20+ B cells | Median pSTAT3 | CD inflamed tissue | 0.0238 | 3.27 |
| Switched memory B cells | Median pSTAT3 | CD inflamed tissue | 0.0319 | 3.70 |
| IgD-IgA- CD19+CD20+ B cells | Median pSTAT3 | CD inflamed tissue | 0.0153 | 3.61 |
| IgD-CD27- B cells | Median pSTAT3 | CD inflamed tissue | 0.0195 | 3.45 |
| IgD-CD27- B cells | Median CD25 | CD inflamed tissue | 0.0195 | 3.66 |

FIG. 4D

| Cell subset | Metric | Higher in | p-value | t-statistic |
|---|---|---|---|---|
| α4β7+CCR9+ PD-1+ NK cells | % of PD-1+ NK cells | CD uninflamed tissue | 0.0165 | -1.46 |
| α4β7+CCR1+GPR15+ CD38+HLA-DR+ CD8 T cells | % of α4β7+ CD38+HLA-DR+ CD8 T cells | CD uninflamed tissue | 0.0165 | -1.79 |
| HLA-DR+ B cells | Median pSTAT1 | CD uninflamed tissue | 0.0172 | -1.71 |
| CCR9+ transitional B cells | % of transitional B cells | CD uninflamed tissue | 0.0165 | -2.15 |
| CD45RO+ B cells | % of CD19+CD20+ | CD inflamed tissue | 0.0172 | 2.47 |

— Basophils (% of live singlets): AUC = 0.679 (95% CI 0.54-0.819)
---- pDC (% of DCs): AUC = 0.665 (95% CI 0.524-0.807)
— - — Effector memory CD4 T cells (median pCREB): AUC = 0.658 (95% CI 0.516-0.801)
——— Basophils (median pCREB): AUC = 0.679 (95% CI 0.539-0.818)
----- CCR9+GPR15+ CD56+ CD19+CD20+ B cells (% of CD56+ CD19+CD20+ B cells): AUC = 0.675 (95% CI 0.535-0.815)
— — — a4B7+CCR1+ CD56+ plasmablasts (% of CD56+ plasmablasts): AUC = 0.667 (95% CI 0.525-0.808)
----- a4B7+ mDCs (% of mDCs): AUC = 0.678 (95% CI 0.538-0.817)
------- IgD–CD27– B cells (% of CD19+CD20+ B cells): AUC = 0.714 (95% CI 0.58-0.848)
——— All 8 parameters: AUC = 0.845 (95% CI 0.742-0.948)

|  | Cohort 1 | Cohort 1 CD vs. UC p-value | Cohort 2 | Cohort 2 CD vs. UC p-value |
|---|---|---|---|---|
| Cohort size (N patients) | 56 | n/a | 12 | n/a |
| Diagnoses (N patients) |  | n/a |  | n/a |
| CD | 24 |  | 6 |  |
| UC | 20 |  | 6 |  |
| HC | 12 |  | 0 |  |
| Disease status (N patients in clinical flare/remission) |  | >0.9999 |  | >0.9999 |
| CD | 13/11 |  | 0/6 |  |
| UC | 10/10 |  | 0/6 |  |
| Sex (N of M/F patients) |  | 0.5467 |  | 0.0801 |
| CD | 11/13 |  | 1/5 |  |
| UC | 7/13 |  | 5/1 |  |
| HC | 8/4 |  | 0/0 |  |
| **Age (years*)** |  | 0.6172 |  | 0.7259 |
| CD | 39 [23-65] |  | 44 [22-65] |  |
| UC | 37 [19-75] |  | 38 [25-60] |  |
| HC | 51 [24-63] |  | n/a |  |
| **Age at onset (years*)** |  | 0.1422 |  | 0.5996 |
| CD | 18 [5-55] |  | 31 [19-52] |  |
| UC | 27.5 [12-60] |  | 29.5 [21-43] |  |
| **Disease duration(years*)** |  | 0.2547 |  | 0.8495 |
| CD | 13.5 [0.08-39] |  | 9 [1-17] |  |
| UC | 7.5 [1-42] |  | 10.5 [4-17] |  |
| Reported extra-intestinal manifestations (N patients) |  | 0.2591 |  | >0.9999 |
| CD | 6 |  | 3 |  |
| UC | 2 |  | 3 |  |
| Crohn's disease phenotype |  | n/a |  | n/a |
| Score (Harvey-Bradshaw Index*) | 2.5 [0-7] |  | 0.5 [0-5] |  |
| Location (N patients) |  |  |  |  |
| Ileum only | 5 |  | 1 |  |
| Ileum and colon | 15 |  | 4 |  |
| Colon only | 4 |  | 1 |  |
| Behavior (N patients) |  |  |  |  |
| Inflammatory | 8 |  | 0 |  |
| Fistulizing | 7 |  | 2 |  |
| Stricturing | 7 |  | 2 |  |
| Fistulizing and stricturing | 2 |  | 2 |  |
| Reported perianal disease (N patients) | 7 |  | 1 |  |
| Ulcerative colitis phenotype |  | n/a |  | n/a |
| Score (Partial Mayo score*) | 4 [0-9] |  | 0 [0-3] |  |
| Location (N patients) |  |  |  |  |
| Left-sided | 7 |  | 3 |  |
| Pan colonic | 12 |  | 3 |  |
| Proctitis | 1 |  | 0 |  |
| **Biopsies collected per patient (N*)** |  | n/a |  | 0.0219 |
| CD | 0 |  | 4 [3-5] |  |
| UC | 0 |  | 3 [3-3] |  |
| Tissue state (N inflamed/uninflamed biopsies) |  | n/a |  | 0.2179 |
| CD | n/a |  | 11/12 |  |
| UC | n/a |  | 5/13 |  |

FIG. 6

BLOOD-BASED SIGNATURES FOR DIAGNOSIS AND SUB-TYPING OF INFLAMMATORY BOWEL DISEASE SUBSETS

CROSS-REFERENCING

This application is a § 371 national phase of International Application No. PCT/US2019/067989, filed on Dec. 20, 2019, which claims the benefit of U.S. provisional application Ser. No. 62/787,977, filed on Jan. 3, 2019, which applications are incorporated by reference in their entireties.

STATEMENT REGARDING FEDERALLY SPONSORED RESEARCH

This invention was made with Government support under contract DK101119 awarded by the National Institutes of Health. The Government has certain rights in the invention.

BACKGROUND

Inflammatory bowel disease (IBD) is increasingly prevalent. Despite available therapies, response remains challenging largely due to heterogeneity of clinical phenotypes. IBD is divided into Crohn's disease (CD) and ulcerative colitis (UC), both chronic relapsing/remitting immune-mediated conditions thought to be triggered by environmental factors in genetically predisposed individuals. Within IBD, there is significant heterogeneity, especially amongst CD patients. CD can affect any part of the gastrointestinal tract, and disease lesions can present as ulcers, strictures, or penetrate from the lumen to the fat wrapping the intestines. CD can be classified by disease behavior—inflammatory (B1; non-stricturing nonpenetrating), stricturing (B2), or penetrating (B3). CD can also be categorized by intestinal region(s) affected, grouped commonly by ileal, ileocolonic, or colonic disease. The majority of CD patients with colonic and/or rectal involvement develop perianal disease. However, there are no objective measures of these disease phenotypes for use as markers of disease, tools to follow disease course, and/or enhance understanding of pathogenesis.

Compared to CD, UC is a relatively homogenous disease restricted to the colon, generally characterized by ulcerations and pseudo-polyps. In the absence of treatment effects, UC always involves the rectum, and disease is typically classified as proctitis (E1; restricted to the rectum), left-sided (E2; involvement from the rectum to the splenic flexure), or pan-colitis (E3; extensive disease beyond the splenic flexure). Conversely, CD is typically patchy with skip lesions. Thus, UC includes a more homogeneous set of disease phenotypes.

CD and UC can be distinguished clinically by disease location (UC is restricted to the colon, while CD can involve any part of the gastrointestinal tract) and disease phenotype (stricturing or penetrating can indicate CD) using endoscopy and imaging. However, gathering this information can be invasive and costly, and still up to 20% of IBD cases with colonic disease are indeterminate. About 10% of patients who undergo colectomy for perceived UC are subsequently diagnosed with CD previously confined to the colon. Because CD and UC can each present with a variety of disease phenotypes, identification of better markers using less invasive methods would enable earlier diagnosis as well as improved monitoring and treatment of disease.

Despite roles of host genetics, the immune system, the microbiota, and the environment in the pathogenesis of IBD, factors responsible for the breadth of disease manifestations between patients (heterogeneity) are not well defined. Identifying and monitoring the symptoms, severity, behavior, and therapeutic response that characterize each disease manifestation (phenotype) is critical for improving health, yet frequently requires the use of invasive procedures such as endoscopy.

In the tissue, IBD is characterized by intestinal barrier breakdown, allowing microbiota to prime the immune system. The ensuing inflammatory response involves recruitment of leukocytes from the periphery to the gut and is associated with dissemination of activated cells in circulation. Since leukocytes that traffic to the gut from the periphery mediate this inflammatory response, we hypothesized that, by enriching for gut tropic cells in the blood, we could detect CD- and UC-specific as well as phenotype-specific signatures and investigate their relationship to the tissue. Since blood is easily accessible, identification of immune signatures in circulation that represent intestinal immunity would be highly informative and provide less invasive tools to assess disease.

Mass cytometry (CyTOF) was used to resolve single cells and characterize their lineage, gut tropism, and function. Consistent with our hypothesis, we identified blood signatures of disease diagnosis, phenotype, and state (flare/remission), heavily represented by gut tropic cell populations and reflective of the greater clinical heterogeneity observed for CD than UC. We report a multi-parameter generalized linear model to classify patients by disease diagnosis (CD/UC), suggesting that blood-based assays to reduce the delay, risk, discomfort, and cost associated with more invasive procedures.

SUMMARY

Provided herein is a method for analyzing peripheral blood leukocytes. In some embodiments, the method may comprise: (a) labeling peripheral blood leukocytes isolated from a patient that has or is suspected of having inflammatory bowel disease (IBD) with a panel of distinguishably-labeled antibodies that bind to CD123, CD14, CD11c, HLA-DR, CD19, CD20, IgD, CD27, CCR9, GPR15, CD56, CD38, $\alpha 4\beta 7$, CCR1, CD4, pCREB, CD8, CD3, and CD45RO or a subset of these markers; and (b) analyzing binding of the antibodies to the peripheral blood leukocytes. Kits for performing the method are also provided.

In some embodiments, the method may be done using at least three, at least four, at least five, at least six, at least seven, at least eight, at least nine, at least ten, at least eleven or at least twelve distinguishably-labeled antibodies, where each antibody binds to a different marker selected from CD123, CD14, CD11c, HLA-DR, CD19, CD20, IgD, CD27, CCR9, GPR15, CD56, CD38, $\alpha 4\beta 7$, CCR1, CD4, pCREB, CD8, CD3, and CD45RO.

Analysis of the binding of the antibodies to the peripheral blood leukocytes can provide a diagnosis of Crohn's disease (CD) or ulcerative colitis (UC) in a patient that has or is suspecting of having inflammatory bowel disease (IBD). This diagnosis has conventionally been done by a colonoscopy with histopathology analysis of biopsies. Depending on how the present method is implemented, the present method can be readily performed on the types of flow cytometers that are commonly found in clinical diagnostic labs. Because the prior diagnostic methods are highly invasive and the present method can in some embodiments be readily implemented using a blood test, the present method is believed to represent significant contribution to the art.

As would be readily apparent, the present method can be used to diagnose Crohn's disease or ulcerative colitis as well as monitor those diseases in patients that have been diagnosed as having one disease or the other.

BRIEF DESCRIPTION OF THE FIGURES

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures:

FIGS. 1A-1H depict a study schematic and features of CD and UC samples. (FIG. 1A) Schematic of the study conducted on cohort 1. Blood was drawn from study subjects, peripheral blood mononuclear cells (PBMCs) were isolated and cryopreserved, and samples were analyzed in batches by CyTOF. (FIG. 1B) viSNE based on 13 core lineage antigens (CD11c, CD56, CD16, CD8, CD3, CD123, CD27, CD24, CD14, CD19, CD4, CD20, and CD45RO) for samples from cohort 1. Coefficient of variation was calculated for each of approximately 2,145 manually computed cell frequencies and median expression levels for each sample in each disease group. Statistics: unpaired two-tailed Student's T-test (CD remission vs. HC, t=12.44, df=4418; CD remission vs. UC remission, t=14.11, df=4412; UC flare vs. HC, t=7.004, df=4409; UC flare vs. UC remission, t=8.612, df=4403). Sample sizes: CD flare=13; CD remission=11; UC flare=10; UC remission=10; HC=12. Center lines=mean; whiskers=standard deviation. (FIG. 1C) Features that distinguished all CD and UC samples. Statistics: unpaired two-tailed Student's T-test using Morpheus (see Methods; $CCR9^+GPR15^+CD56^+B$ cells, t=2.58; $\alpha4\beta7^+CCR1^+CD56^+$plasmablasts, t=2.74). Sample sizes: CD=23, UC=18. Center lines=mean; whiskers=standard deviation. (FIG. 1D) Features differentiating CD and UC identified by hypothesis-driven tests. Statistics: unpaired two-tailed Student's T-test (Basophils [% of live singlets]: all CD vs. all UC, t=2.57, df=42; CD flare vs. UC flare, t=3.34, df=21; CD flare vs. HC, t=2.79, df=23; CD flare vs. remission, t=2.87, df=22; all UC vs. HC, t=3.88, df=30; UC flare vs. HC, t=4.02, df=20; UC flare vs. remission, t=6.91; df=18. Basophils [median pCREB]: all CD vs. all UC, t=2.53, df=42; CD flare vs. UC flare, t=3.17; df=21. pDCs [% of DCs]: all CD vs. all UC, t=2.61, df=42; CD flare vs. UC flare, t=2.97, df=21; UC flare vs. remission, t=4.03; df=18. $\alpha4\beta7^+$mDCs [% of mDCs]: all CD vs. all UC, t=2.07, df=39; CD flare vs. UC flare, t=3.30, df=19; CD flare vs. remission, t=2.33, df=21. Effector memory CD4 T cells [median pCREB]: all CD vs. all UC, t=2.27, df=42; CD flare vs. UC flare, t=3.13, df=21; CD flare vs. remission, t=2.92; df=22. $IgD^-CD27^-$B cells [% of $CD19^+CD20^+$]: all CD vs. all UC, t=2.15, df=42; CD flare vs. UC flare, t=2.77, df=21; UC flare vs. remission, t=3.47, df=18; UC flare vs. HC, t=5.05, df=20). Sample sizes: all CD=24 (23 for $\alpha4\beta7^+$mDCs); CD flare=13; CD remission=11 (10 for $\alpha4\beta7^+$mDCs); all UC=20 (18 for $\alpha4\beta7^+$mDCs); UC flare=10 (8 for $\alpha4\beta7^+$mDCs); UC remission=10; HC=12. Center lines=mean; whiskers=standard deviation. Significant differences between CD remission (N=11) and HC (N=12) samples (FIG. 1E), CD flare (N=13) and CD remission (N =11) samples (FIG. 1F), UC remission (N=10) and HC (N=12) samples (FIG. 1G), and UC flare (N=10) and UC remission (N=10) samples (FIG. 1H) with $p \leq 0.05$ after correction for multiple testing. FIG. 1H also shows a Pearson correlations based on vectors that represent all significant feature values for individual patients shown in the heatmaps immediately to the left. Statistics: unpaired two-tailed Student's T-test using Morpheus (see Methods; t-statistics shown in heatmap legends).

(FIG. 3A) Schematic of the study conducted on cohort 2. Blood was drawn and biopsies were collected from study subjects, peripheral blood mononuclear cells (PBMCs) and tissue leukocytes were isolated and cryopreserved, and samples were analyzed in batches by CyTOF. (FIG. 3B) viSNE based on 15 core lineage antigens (CD11c, CD11b, CD56, CD16, CD8, CD3, CD123, CD27, CD24, CD14, CD19, CD4, CD20, TCRγδ, and CD45RO) for samples from cohort 2. Sample sizes: CD blood=6; UC blood=6; CD inflamed tissue=11; CD uninflamed tissue=12; UC inflamed tissue=5; UC uninflamed tissue=13. (FIG. 3C) Significant differences between disease tissues consistent with trends observed in the blood from cohort 1. Statistics: unpaired two-tailed Student's T-test (Basophils: all CD vs. all UC tissue, t=1.83, df=39; UC inflamed vs. uninflamed tissue, t=2.43, df=16. Plasmablasts: all CD vs. all UC tissue, t=2.51, df =39). Sample sizes: CD blood=6 (5 for $\alpha4\beta7^+$); UC blood=6; all CD tissue=23; CD inflamed tissue=11; CD uninflamed tissue=12; all UC tissue=18; UC inflamed tissue=5; UC uninflamed tissue=13. Center lines=mean; whiskers=standard deviation. (FIG. 3D) T peripheral helper (Tph) cells, defined as $CD3^+CD4^+CD45RO^+CXCR5^-PD-1^+$, in paired blood and tissue samples. Statistics: unpaired two-tailed Student's T-test (all blood vs. tissue, t=2.65, df=51; all CD vs. UC tissue, t=2.25, df=39; CD inflamed vs. uninflamed tissue, t=0.75, df=21). Sample sizes: all blood=12; all tissue=41; all CD tissue=23; all UC tissue=18; CD inflamed tissue=11; CD uninflamed tissue=12. Center lines=mean; whiskers=standard deviation. (FIG. 3E) Of 2,145 manually gated cell frequencies and median expression levels, 795 were significantly different ($p \leq 0.05$; data not shown) between blood (N=12) and tissue (N=41) and were used to construct the Pearson correlation map (right). Statistics: unpaired two-tailed Student's T-test using Morpheus (see Methods). Center lines=mean; whiskers=standard deviation. Of 2,145 parameters, three were correlated (green box) between blood and ileum tissue samples. Statistics: Pearson correlation coefficient (r) and p-values from Pearson correlation tests are shown. P-values were not corrected for multiple testing, as tests were hypothesis-driven. Sample sizes: 10 blood/tissue pairs for $CD3^+CD14^-CD11c^+HLA-DR^+$cells and central memory CD4 T cell median pCREB expression; 9 blood/tissue pairs for $CCR9^+$ switched memory B cells. Solid line=linear regression; dotted lines=95% confidence interval.

FIGS. 4A-4E depict a schematic of tissue comparisons and features of CD and UC as well as inflamed and uninflamed areas. (FIG. 4A) Schematic of tissue comparisons in the order presented in this figure. Features that distinguish all CD and UC tissue (FIG. 4B), inflamed CD and UC tissue (FIG. 4C), and inflamed and uninflamed CD tissue (FIG. 4D). Statistics: unpaired two-tailed Student's T-test using Morpheus (see Methods). Center lines =mean; whiskers=standard deviation. (FIG. 4E) Paired CD tissue from inflamed and uninflamed areas of the same region (N=4 pairs consisting of samples 239_1 and 239_4, 249_3 and 249_5, 252_1 and 252_3, and 255_1 and 255_3) were compared by screening approximately 2,145 manually calculated cell frequencies and median expression levels. Statistics: ratio paired T-test (df=3; $CD45RO^+CD4$ T cells, t=5.48; $CD27^+CD45RO$ -CD4 T cells, t=5.74; $CD43^+T$ cells, t=3.76; $CD25^+CD19^+CD20^+B$ cells, t=3.51). P-values were not corrected for multiple testing because targeted tests were conducted after pre-screening features. Lines connect paired samples from the same subject.

(FIG. 5A) Schematic of the approach for non-invasive classification of CD vs. UC based on blood. Blood was drawn from study subjects, peripheral blood mononuclear cells (PBMCs) were isolated and cryopreserved, and samples were analyzed in batches by CyTOF. (FIG. 5B) Generalized linear models (GLMs) were created for eight parameters significantly different between all CD and UC samples. Corresponding receiver-operating characteristic (ROC) curves are shown for single feature and eight feature models. All CD and UC samples were used to plot ROC curves. UC was used as baseline for the purposes of the GLMs, such that a true-positive indicates correct classification of a CD sample. Statistics: generalized linear models were constructed using glm in R. Cutoffs and associated performance characteristics are discussed in the text.

FIG. 6 depicts a table of demographic and clinical characteristics of the patients. Cohort 1 contained blood samples, and cohort 2 contained paired blood and tissue biopsy samples. All clinical data reflects the time of sample collection. P-values are shown where applicable for CD vs. UC disease groups in cohorts 1 and 2. Statistics: unpaired two-tailed Student's T-test (cohort 1 age, t=0.5036, df =42; cohort 2 age, t=0.3607, df=10; cohort 1 age at onset, t=1.496, df=42; cohort 2 age at onset, t=0.5421, df=10; cohort 1 disease duration, t=1.155, df=42; cohort 2 disease duration, t=0.1947, df=10; cohort 2 biopsies collected per patient, t=2.712, df=10) and two-sided Fisher's exact test (disease status; sex; reported extra-intestinal manifestations; tissue state). Sample sizes are shown in the table for each comparison. (*=median [range]; CD=Crohn's disease; UC=ulcerative colitis; HC=healthy control).

DETAILED DESCRIPTION

Figure 1D:
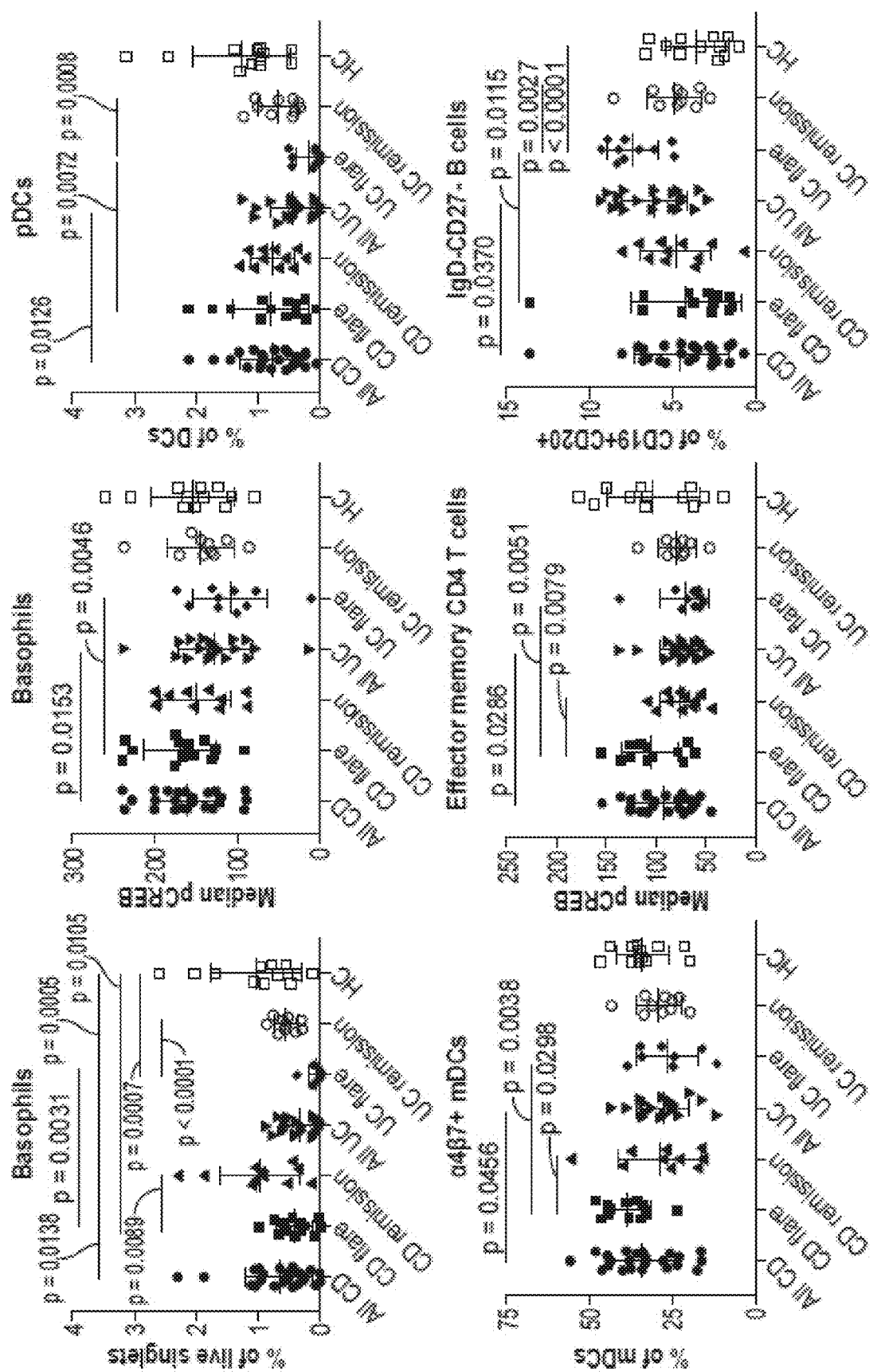

The practice of the present invention will employ, unless otherwise indicated, conventional methods of pharmacology, chemistry, biochemistry, recombinant DNA techniques and immunology, within the skill of the art. Such techniques are explained fully in the literature. See, e.g., *Handbook of Experimental Immunology*, Vols. I-IV (D. M. Weir and C. C. Blackwell eds., Blackwell Scientific Publications); A. L. Lehninger, *Biochemistry* (Worth Publishers, Inc., current addition); Sambrook, et al., *Molecular Cloning: A Laboratory Manual* (2nd Edition, 1989); *Methods In Enzymology* (S. Colowick and N. Kaplan eds., Academic Press, Inc.).

All publications, patents and patent applications cited herein, whether supra or infra, are hereby incorporated by reference in their entireties.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supercedes any disclosure of an incorporated publication to the extent there is a contradiction.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It must be noted that, as used in this specification and the appended claims, the singular forms "a", "an" and "the" include plural referents unless the content clearly dictates otherwise. Thus, for example, reference to "an agonist" includes a mixture of two or more such agonists, and the like.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Method for Analyzing a Sample

As noted above, a method for analyzing peripheral blood leukocytes from a patient that has or is suspected of having inflammatory bowel disease (IBD) is provided. In some embodiments, the method may comprise analyzing peripheral blood leukocytes from a patient that has or is suspected of having active inflammatory bowel disease (IBD) or having an IBD flare. In some embodiments, the method may comprise: (a) labeling the peripheral blood leukocytes with a panel of distinguishably-labeled antibodies; and (b) analyzing binding of the antibodies to the peripheral blood leukocytes. The antibodies used in the method may separately bind to CD123, CD14, CD11c, HLA-DR, CD19, CD20, IgD, CD27, CCR9, GPR15, CD56, CD38, α4β7, CCR1, CD4, pCREB, CD8, CD3, and CD45RO or a subset of these markers. These antibodies enable a diagnosis of Crohn's disease or ulcerative colitis using the eight parameter model described below. In some embodiments, the method may be implemented with up to 8, 9, 10, or 11 antibodies, where each antibody specifically binds to a specific cell surface protein. In some embodiments and as will be described in greater detail below, variations of the method may be implemented with up to 10 antibodies, up to 11 antibodies, up to 15 antibodies, or up to 30 antibodies, where the antibodies bind to different proteins on or in a cell. In some embodiments, the cells may be labeled with a cocktail of the antibodies (i.e., an aqueous mixture of the antibodies). However, in some embodiments and depending on how the method is performed, the sample may be split and subjected to multiple different analyses using subsets, e.g., up to 10, of the antibodies. The results of those assays can then be combined, if necessary. In some embodiments, the panel may further comprise a distinguishably-labeled antibody that binds to CD14 and/or a stain that differentially labels live and dead cells (i.e., a so-called "live/dead" or "viability" stain).

In some embodiments the method may comprise analyzing the binding of antibodies to CD123, CD11c, HLA-DR, CD19, CD20, CD56, CCR9, GPR15, and, optionally, CD14 on the cells in the presence or absence of a live/dead stain. These antibodies enable a diagnosis of Crohn's disease or ulcerative colitis using a three parameter model described below. In some embodiments the method may comprise analyzing the binding of antibodies to CD123, HLA-DR, CD11c, α4β7, CD19, CD20, IgD, CD27, CD56, CCR1, CD38, and, optionally, CD14 on the cells in the presence or absence of a live/dead stain. These antibodies enable a diagnosis of Crohn's disease or ulcerative colitis using a five parameter model or the four parameter model described below. Alternatively, the method may comprise analyzing the binding of antibodies to CD123, HLA-DR, CD11c, α4β7, CD19, CD20, IgD, CD27, CCR9, GPR15, CD56, and optionally, CD14 on the cells in the presence or absence of a live/dead stain. These antibodies also enable a diagnosis of Crohn's disease or ulcerative colitis using the four or a five parameter model described below. In some embodiments, the method may comprise analyzing the binding of antibodies to CD123, HLA-DR, CD11c, α4β7, CD19, CD20, IgD, CD27, CCR9, GPR15, CD56, CCR1, CD38, and optionally, CD14 on the cells in the presence or absence of a live/dead stain. These antibodies enable a diagnosis of Crohn's disease or ulcerative colitis using the four parameter model, a five parameter model, and the six parameter model described below. In some embodiments the method may comprise analyzing the binding of antibodies to CD123, HLA-DR, pCREB, CD11c, α4β7, CD19, CD20, IgD, CD27, CD4, CD45RO, CCR9, GPR15, CD56, CCR1, CD38, and optionally, CD14, and/or CD3, and/or CD8 on or in (pCREB is an intracellular protein) the cells in or the presence or absence of a live/dead stain. These antibodies enable a diagnosis of Crohn's disease or ulcerative colitis using the four, five, six or eight parameter models described below.

The analysis can be done in a variety of different ways. For example, in some embodiments, the method may be done by cytometry. In some embodiments the antibodies may be fluorescently labeled. In these embodiments, the analysis of may be done by flow cytometry (see, e.g., Picot Cytotechnology. 2012 64: 109-30, among many others). In other embodiments the antibodies may be mass-tagged. In these embodiments, the analysis may be done by mass cytometry (see, e.g., Bandura et al Analytical Chemistry 2009 81 6813-6822).

The general principles of flow cytometry, including methods by which single cell suspensions can be made, methods by which cells can be labeled using, e.g., fluorescently labeled antibodies, methods by which cells can be separated from one another, as well as hardware that can be employed in flow cytometry, including flow cells, reagents, and computer control systems are known and are reviewed in a variety of publications, including, but not limited to: Craig et al (Clin Lab Med. 2007 27:487-512), Ebo (Allergy. 2006 61:1028-39), Rieseberg (Appl. Microbiol. Biotechnol. 2001 56:350-60), Brown et al (Clin Chem. 2000 46:1221-9), Horsburgh et al (Transpl Immunol. 2000 8:3-15), Jonker et al (Histochem J. 1997 29: 347-64); Corberand et al (Hematol. Cell Ther. 1996 38:487-94); Othmer (Eur. J. Pediatr. 1992 151:398-406); Willman et al (Semin. Diagn. Pathol. 1989 6:3-12) and Sugarbaker et al (Int. Adv. Surg. Oncol. 1979 2:125-53), as well as U.S. Pat. Nos. 7,709,821, 7,634,126, 7,580,120, 7,561,267, 7,468,789, 7,369,231, 7,300,763, 7,299,135, 7,113,266, 7,092,078, 7,024,316, 6,867,899, 6,861,265, and 6,813,017, for example, which publications are incorporated by reference herein for disclosure of those methods and hardware.

Likewise, the general principles of mass cytometry, including methods by which single cell suspensions can be made, methods by which cells can be labeled using, e.g., mass-tagged antibodies, methods for atomizing particles and methods for performing elemental analysis on particles, as well as hardware that can be employed in mass cytometry, including flow cells, ionization chambers, reagents, mass spectrometers and computer control systems are known and are reviewed in a variety of publications including, but not limited to Bandura et al Analytical Chemistry 2009 81 6813-6822), Tanner et al (Pure Appl. Chem 2008 80: 2627-2641), U.S. Pat. No. 7,479,630 (Method and apparatus for flow cytometry linked with elemental analysis) and U.S. Pat.

No. 7,135,296 (Elemental analysis of tagged biologically active materials); and published U.S. patent application 20080046194, for example, which publications are incorporated by reference herein for disclosure of those methods and hardware.

In other embodiments, the antibodies may be tethered to oligonucleotides and the analysis may be done by sequencing the oligonucleotides that are tethered to the antibodies bound to the peripheral blood leukocytes. In these embodiments, the antibodies may be tethered to different oligonucleotides before they are bound to the cells. After the antibodies have bound to the cells and unbound antibodies have been washed away, the oligonucleotides may or may not be cleaved from the antibodies and then amplified, hybridized, or sequenced. Other methods for analyzing the binding of antibodies to cells are known.

As would be apparent, in some embodiments the method may comprise obtaining a sample of blood from the patient, and then isolating peripheral blood leukocytes from the blood before performing the method. These initial steps are well known in the art.

Diagnostic Method

As noted above, the method may be used as a diagnostic for Crohn's disease and ulcerative colitis. In these embodiments, the method may comprise (c) independently calculating two or more of: (i) the percentage of all cells or all live single cells that are $CD123^+$ $HLA-DR^+$; (ii) the percentage of all $CD14^-$ $CD11c^+$ $HLA-DR^+$ cells that are $CD11c^{low}$ $CD123^+$; and (iv) the percentage of all $CD56^+$ $CD19^+$ $CD20^+$ cells that are $CCR9^+$ $GPR15^+$. In some embodiments, the method may comprise (c) independently calculating all of (i) the percentage of all cells or all live single cells that are $CD123^+$ $HLA-DR^+$; (ii) the percentage of all $CD14^-$ $CD11c^+HLA-DR^+$ cells that are $CD11c^{low}$ $CD123^+$; (iii) the percentage of all $CD19^+$ $CD20^+$ cells that are $IgD^-$ $CD27^-$; and (iv) the percentage of all $CD56^+$ $CD19^+$ $CD20^+$ cells that are $CCR9^+$ $GPR15^+$. In some embodiments, the method may comprise (c) independently calculating two or more of (i) the percentage of all cells or all live single cells that are $CD123^+$ $HLA-DR^+$; (ii) the percentage of all $CD14^-$ $CD11c^+HLA-DR^+$ cells that are $CD11c^{low}$ $CD123^+$; (iii) the percentage of all $CD19^+$ $CD20^+$ cells that are $IgD^-$ $CD27^-$; (iv) the percentage of all $CD56^+$ $CD19^+$ $CD20^+$ cells that are $CCR9^+$ $GPR15^+$; (v) the median level of pCREB in all cells that are $CD3^+CD4^+CD27^-CD45RO^+$; (vi) the median level of pCREB in all cells that are $CD123^+$ $HLA-DR^+$; (vii) the percentage of all $CD19^+$ $CD20^-$ $CD27^+$ $CD38^+$ $CD56^+$ cells that are $\alpha4\beta7^+$ $CCR1^+$; and (viii) the percentage of all $CD14^-$ $CD11c^+$ $HLA-DR^+$ cells not $CD11c^{low}$ $CD123^+$ that are $\beta4\beta7^+$. In some embodiments, the method may comprise (c) independently calculating all of (i) the percentage of all cells or all live single cells that are $CD123^+$ $HLA-DR^+$; (ii) the percentage of all $CD14^-$ $CD11c^+$ $HLA-DR^+$ cells that are $CD11c^{low}$ $CD123^+$; (iii) the percentage of all $CD19^+$ $CD20^+$ cells that are $IgD^-$ $CD27^-$; (iv) the percentage of all $CD56^+$ $CD19^+$ $CD20^+$ cells that are $CCR9^+$ $GPR15^+$; (v) the median level of pCREB in all cells that are $CD3^+CD4^+CD27^-CD45RO^+$; (vi) the median level of pCREB in all cells that are $CD123^+$ $HLA-DR^+$; (vii) the percentage of all $CD19^+$ $CD20^-$ $CD27^+$ $CD38^+$ $CD56^+$ cells that are $\alpha4\beta7^+$ $CCR1^+$; and (viii) the percentage of all $CD14^-$ $CD11c^+$ $HLA-DR^+$ cells not $CD11c^{low}$ $CD123^+$ that are $\alpha4\beta7^+$. In these embodiments, the method may further comprise providing a report indicating the percentages of one or more (e.g., all of (i)-(ii) and (iv) or all of (i)-(viii)).

These percentages can be compared to reference values obtained from control samples obtained from, e.g., patients that do not have inflammatory bowel disease or who have a known diagnosis of Crohn's disease or ulcerative colitis, where the reference values may be correspond to, for example, an average of the same percentages, i.e., (i) the percentage of all cells or all live single cells that are $CD123^+$ $HLA-DR^+$; (ii) the percentage of all $CD14^-$ $CD11c^+$ $HLA-DR^+$ cells that are $CD11c^{low}$ $CD123^+$; (iii) the percentage of all $CD19^+$ $CD20^+$ cells that are $IgD^-$ $CD27^-$; and (iv) the percentage of all $CD56^-$ $CD19^-$ $CD20^+$ cells that are $CCR9^+$ $GPR15^+$ from the patients. This analysis can provide a diagnosis of Crohn's disease or ulcerative colitis for the patient.

In general, patients that have Crohn's disease have higher percentage of cells defined by (i), (ii) and (iv) and patients that have ulcerative colitis have a higher percentage of cells defined by (iii). For diagnosing which disease a patient has, the totality of the evidence may be examined and the method may involve calculating a score based on the evidence (e.g., using the percentages listed above). In these embodiments, the data may be subjected to statistical procedures, including frequentist or Bayesian procedures, and the evidence for a diagnosis may be summarized as a likelihood value, or alternatively a Bayes factor or a posterior probability in the context of a Bayesian analysis or the like. In these embodiments, this statistical score can be altered by other data as it accumulates. For example, the combined evidence for a diagnosis (which evidence may include, for example, an analysis of the percentages described above) can be summarized as a score (e.g., a P-value or the like) and the score can be compared to a threshold to determine if a diagnosis can be made (i.e., whether the condition is or is not predicted to be present in the subject). For example, if the score summarizing the combined evidence is 0.91 and the likelihood threshold for making a diagnosis is 0.95, then the diagnosis may not be made and the relevant condition is not predicted to be present in the subject. On the other hand, if the score summarizing the combined evidence is 0.98 and the likelihood threshold for making a diagnosis is 0.95, then the diagnosis can be made and the relevant condition is predicted to be present in the subject. These analysis methods as well as the threshold can be done by machine learning, if desired.

In some embodiments, the method may comprise providing a report indicating whether the subject has Crohn's disease or ulcerative colitis based on the analysis described above. In some embodiments, this step may involve calculating a score, where the score correlates with strength of the evidence for a diagnosis of Crohn's disease or ulcerative colitis and can be a number such as a probability, likelihood or score out of 10, for example. In these embodiments, the method may comprise inputting the percentages as described above, executing the algorithms, and receiving a score based on the calculations. In these embodiments, other measurements from the subject, e.g., whether the subject is male, the age of the subject, white blood cell count, neutrophils count, etc., may be input into the algorithm.

In some embodiments, the method may involve creating a report that shows the score, e.g., in an electronic form, and forwarding the report to a doctor or other medical professional to help identify a suitable course of action, e.g., to identify a suitable therapy for the subject. The report may be used along with other metrics as a diagnostic to determine whether the subject has a disease or condition.

In any embodiment, a report can be forwarded to a "remote location", where "remote location," means a location other than the location at which the data is examined. For example, a remote location could be another location (e.g., office, lab, etc.) in the same city, another location in a different city, another location in a different state, another location in a different country, etc. As such, when one item is indicated as being "remote" from another, what is meant is that the two items can be in the same room but separated, or at least in different rooms or different buildings, and can be at least one mile, ten miles, or at least one hundred miles apart. "Communicating" information references transmitting the data representing that information as electrical signals over a suitable communication channel (e.g., a private or public network). "Forwarding" an item refers to any means of getting that item from one location to the next, whether by physically transporting that item or otherwise (where that is possible) and includes, at least in the case of data, physically transporting a medium carrying the data or communicating the data. Examples of communicating media include radio or infra-red transmission channels as well as a network connection to another computer or networked device, and the internet or including email transmissions and information recorded on websites and the like. In certain embodiments, the report may be analyzed by an MD or other qualified medical professional, and a report based on the results of the analysis of the data may be forwarded to the subject from which the sample was obtained.

In computer-related embodiments, a system may include a computer containing a processor, a storage component (i.e., memory), a display component, and other components typically present in general purpose computers. The storage component stores information accessible by the processor, including instructions that may be executed by the processor and data that may be retrieved, manipulated or stored by the processor.

The storage component includes instructions for determining whether the subject has Crohn's disease or ulcerative colitis using the measurements described above as inputs. The computer processor is coupled to the storage component and configured to execute the instructions stored in the storage component in order to receive patient data and analyze patient data according to one or more algorithms. The display component may display information regarding the diagnosis of the patient.

The storage component may be of any type capable of storing information accessible by the processor, such as a hard-drive, memory card, ROM, RAM, DVD, CD-ROM, USB Flash drive, write-capable, and read-only memories. The processor may be any well-known processor, such as processors from Intel Corporation. Alternatively, the processor may be a dedicated controller such as an ASIC.

The instructions may be any set of instructions to be executed directly (such as machine code) or indirectly (such as scripts) by the processor. In that regard, the terms "instructions," "steps" and "programs" may be used interchangeably herein. The instructions may be stored in object code form for direct processing by the processor, or in any other computer language including scripts or collections of independent source code modules that are interpreted on demand or compiled in advance.

Data may be retrieved, stored or modified by the processor in accordance with the instructions. For instance, although the diagnostic system is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information which is used by a function to calculate the relevant data.

Patient Monitoring

The present method solves another problem because it provides a way to quantify the severity of Crohn's disease and ulcerative colitis as well as providing a diagnosis. As such, once a diagnosis has been made, the disease can monitored (e.g., quantified) in the future using the same method, without any patient-specific customization. As such, the same method can be performed on different samples collected from the same patient at different timepoints, and a score indicating the severity of a disease at the first time-point can be compared to the score indicating the severity of the disease at the second time-point in order to determine if the severity of the disease has changed. In these embodiments, the method may comprise separately analysing a first test sample and a second test sample using the present method to obtain first and second scores, and comparing the scores, where the first and second test samples are obtained from the same subject at different time points. The first and second ratios can be compared to determine if the a treatment or procedure (which may have occurred between the first and second points) has had any effect. Thus, the present method may be performed on patients that have been diagnosed as having Crohn's disease or ulcerative colitis at regular intervals (where the period may be in the range of every 2 to 12 months, for example).

Therapeutic Methods

After a diagnosis of Crohn's disease or ulcerative colitis, a patient may be treated, as appropriate. For example, for patients that are newly diagnosed as having Crohn's disease, a corticosteroid may be used for a brief period of time to rapidly improve symptoms alongside another medication such as either methotrexate or a thiopurine used to prevent recurrence (see, e.g., Baumgart Lancet. 2012 380: 1590-605).

Ulcerative colitis can be treated with a number of medications, including 5-ASA drugs such as sulfasalazine and mesalazine and corticosteroids such as prednisone. Immunosuppressive medications such as azathioprine and biological agents such as infliximab and adalimumab can be prescribed if a patient cannot achieve remission with 5-ASA and corticosteroids. In addition, ulcerative colitis can be treated using budesonide or tofacitinib as well as cyclosporin, tacrolimus, fexofenadine, aminosalicylates, e.g., 5-aminosalicylic acid, TNF inhibitors (e.g., infliximab, adalimumab, and golimumab), tofacitinib, vedolizumab, and etrolizumab. Unlike in Crohn's disease, the gastrointestinal aspects of ulcerative colitis can generally be cured by surgical removal of the large intestine, though extraintestinal symptoms may persist. Removal of the colon by surgery may be necessary in some cases. Dietary changes may also be implemented.

Alternative Embodiments

Also provided is a method for enriching for gut tropic cells for the detection or diagnosis of a gastrointestinal conditions comprising isolating cells that bind to antibodies that bind to $\alpha 4\beta 7$, CCR1, CCR9, and/or GPR15. These antibodies can be purchased from commercial vendors and the enrichment can be done using cell enrichment methods that are known in the art, e.g., FACS and other methods. These antibodies can be used to physically enrich for cells for further analysis (i.e., separate those cells from other cells) or the antibodies may be used to identify a subset of cells within a larger cell population, in a similar way to as described above.

Kits

Also provided by this disclosure are kits for practicing the subject methods, as described above. In some embodiments, the kit may comprise a panel of antibodies that bind to CD123, CD11c, HLA-DR, CD19, CD20, IgD, CD27, CCR9, GPR15, CD56, CD38, α4β7, CCR1, CD4, pCREB, CD8, CD3, and CD45RO or a subset of these markers. These antibodies may be in a cocktail or in different vessels. The kit may additionally comprise an antibody that binds to CD14 and/or a stain that distinguishes live cells from dead cells. In some embodiments, the antibodies may be distinguishably labeled. In some embodiments, the total number of antibodies in the kit may be less than 30, less than 20 or less than 15, for example. In some embodiments, the kit may comprise antibodies that bind to CD123, HLA-DR, CD11c, CD19, CD20, CD56, CCR9, GPR15, and, optionally, CD14 and/or a live/dead stain; antibodies that bind to CD123, HLA-DR, CD11c, α4β7, CD19, CD20, IgD, CD27, CD56, CCR1, CD38, and, optionally, CD14 and/or a live/dead stain; antibodies that bind to CD123, HLA-DR, CD11c, α4β7, CD19, CD20, IgD, CD27, CCR9, GPR15, CD56, and, optionally, CD14 and/or a live/dead stain; CD123, HLA-DR, CD11c, α4β7, CD19, CD20, IgD, CD27, CCR9, GPR15, CD56, CCR1, CD38, and, optionally, CD14 and/or a live/dead stain; or CD123, HLA-DR, pCREB, CD11c, α4β7, CD19, CD20, IgD, CD27, CD4, CD45RO, CCR9, GPR15, CD56, CCR1, CD38, and optionally, CD14, and/or CD3, and/or CD8 and/or a live/dead stain.

The various components of the kit may be present in separate containers or certain compatible components may be precombined into a single container, as desired. The kit may also comprise buffers, labels and instructions for performing the present method.

In addition to the above-mentioned components, the subject kit may further include instructions for using the components of the kit to practice the subject method.

Embodiments

Embodiment 1. A method for analyzing peripheral blood leukocytes, comprising:
(a) labeling peripheral blood leukocytes isolated from a patient that has or is suspected of having inflammatory bowel disease (IBD) with a panel of distinguishably-labeled antibodies that bind to CD123, HLA-DR, CD11c, CD19, CD20, IgD, CD27, CCR9, GPR15 and CD56; and
(b) analyzing binding of the antibodies to the peripheral blood leukocytes.

Embodiment 2. The method of embodiment 1, wherein the analysis of (b) is done by cytometry.

Embodiment 3. The method of embodiments 1 or 2, wherein the antibodies are fluorescently labeled and the analysis of (b) is done by flow cytometry.

Embodiment 4. The method of embodiments 1 or 2, wherein the antibodies are mass-tagged, and the analysis of (b) is done by mass cytometry.

Embodiment 5. The method of embodiment 1, wherein the antibodies are tethered to oligonucleotides and the analysis of (b) is done by sequencing the oligonucleotides that are tethered to the antibodies bound to the peripheral blood leukocytes.

Embodiment 6. The method of any prior embodiment, wherein the panel further comprises a distinguishably labeled antibody that binds to CD14 and/or a stain that distinguishes live cells from dead cells.

Embodiment 7. The method of any prior embodiment, wherein the method comprises
(c) independently calculating two or more of:
(i) the percentage of all cells or all live single cells that are CD123$^+$ HLA-DR$^+$;
(ii) the percentage of all CD14$^-$ CD11c$^+$ HLA-DR$^+$ cells that are CD11c$^{low}$ CD123$^+$;
(iii) the percentage of all CD19$^+$ CD20$^+$ cells that are IgD$^-$ CD27$^-$; and
(iv) the percentage of all CD56$^+$ CD19$^+$ CD20$^+$ cells that are CCR9$^+$GPR15$^+$.

Embodiment 8. The method of embodiment 7, further comprising providing a report indicating the percentages of (i)-(iv).

Embodiment 9. The method of embodiment 8, comprising comparing the percentages of (i)-(iv) to reference values.

Embodiment 10. The method of embodiment 9, further comprising diagnosing the patient as having Crohn's disease (CD) or ulcerative colitis (UC) based on the comparisons.

Embodiment 11. The method of any prior embodiment, wherein the method comprises analyzing the binding of antibodies to CD123, HLA-DR, CD11c, α4β7, CD19, CD20, IgD, CD27, CD56, CCR1, CD38, and, optionally, CD14 on the cells in the presence or absence of a live/dead stain.

Embodiment 12. The method of any prior embodiment, wherein the method comprises analyzing the binding of antibodies to CD123, HLA-DR, CD11c, α4β7, CD19, CD20, IgD, CD27, CCR9, GPR15, CD56, and optionally, CD14 on the cells in the presence or absence of a live/dead stain.

Embodiment 13. The method of any prior embodiment, wherein the method comprises analyzing the binding of antibodies to CD123, HLA-DR, CD11c, α4β7, CD19, CD20, IgD, CD27, CCR9, GPR15, CD56, CCR1, CD38, and optionally, CD14 on the cells in the presence or absence of a live/dead stain.

Embodiment 14. The method of any prior embodiment, wherein the method comprises analyzing the binding of antibodies to CD123, HLA-DR, pCREB, CD11c, α4β7, CD19, CD20, IgD, CD27, CD4, CD45RO, CCR9, GPR15, CD56, CCR1, CD38, and optionally, CD14, and/or CD3, and/or CD8 to the cells in or the presence or absence of a live/dead stain.

Embodiment 15. A kit comprising antibodies that bind to CD123, HLA-DR, CD11c, CD19, CD20, IgD, CD27, CCR9, GPR15 and CD56.

Embodiment 16. The kit of embodiment 15, further comprising an antibody that binds to CD14.

Embodiment 17. The kit of embodiment 15 or 16, further comprising stain that distinguishes live cells from dead cells.

Embodiment 18. The kit of any of embodiments 15-17, wherein the antibodies are distinguishably labeled.

Embodiment 19. The kit of any of embodiments 15-18, wherein the kit comprises antibodies that bind to
CD123, HLA-DR, CD11c, α4β7, CD19, CD20, IgD, CD27, CD56, CCR1, CD38, and, optionally, CD14 and/or a live/dead stain;
CD123, HLA-DR, CD11c, α4β7, CD19, CD20, IgD, CD27, CCR9, GPR15, CD56, and, optionally, CD14 and/or a live/dead stain;
CD123, HLA-DR, CD11c, α4β7, CD19, CD20, IgD, CD27, CCR9, GPR15, CD56, CCR1, CD38, and, optionally, CD14 and/or a live/dead stain; or CD123, HLA-DR, pCREB, CD11c, α4β7, CD19, CD20, IgD, CD27, CD4, CD45RO, CCR9, GPR15, CD56, CCR1, CD38, and optionally, CD14, and/or CD3, and/or CD8 and/or a live/dead stain.

Embodiment 20. A method for enriching for gut tropic cells for the detection or diagnosis of a gastrointestinal condition comprising isolating or analyzing cells that bind to antibodies that bind to α4β7, CCR1, CCR9, and/or GPR15.

Examples

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations may be used, e.g., room temperature (RT); base pairs (bp); kilobases (kb); picoliters (pl); seconds (s or sec); minutes (m or min); hours (h or hr); days (d); weeks (wk or wks); nanoliters (nl); microliters (ul); milliliters (ml); liters (L); nanograms (ng); micrograms (ug); milligrams (mg); grams ((g), in the context of mass); kilograms (kg); equivalents of the force of gravity ((g), in the context of centrifugation); nanomolar (nM); micromolar (uM), millimolar (mM); molar (M); amino acids (aa); kilobases (kb); base pairs (bp); nucleotides (nt); intramuscular (i.m.); intraperitoneal (i.p.); subcutaneous (s.c.); phosphorylated (p as a prefix to the name of a molecule, as in pCREB to indicated phosphorylated CREB); and the like.

Summary

A comprehensive mass cytometry study of blood as well as paired blood and tissue samples from IBD and healthy subjects using surface and intracellular markers was conducted to analyze leukocyte subsets, characterize their function(s), and expression of gut-homing molecules. Molecular and cellular signatures of heterogeneity observed amongst disease diagnoses and phenotypes, as well as novel disease-associated leukocyte signatures, were found. Some signatures persisted in IBD patients despite clinical remission, and many signatures were highly represented by leukocyte subsets that express gut trafficking molecules. Distinct systemic and local immune signatures, suggesting patterns of cell localization in disease, were reported. The findings highlight the importance of gut tropic leukocytes in circulation and reveal that blood-based immune signatures differentiate clinically relevant subsets of IBD.

At the tissue level, IBD is characterized by intestinal barrier breakdown, allowing microbiota to prime the immune system. This process causes a feed-forward inflammatory response that involves recruitment of leukocytes from the periphery to the gut and is also associated with dissemination of activated cells in circulation[2,12,13]. Since leukocytes that traffic to the gut from the periphery mediate this ongoing inflammatory response, it was hypothesized that by enriching for gut tropic cells in the blood of IBD patients CD- and UC-specific as well as disease phenotype-specific signatures could be detected and their relationship to tissue isolated cells could be investigated.

Mass cytometry (CyTOF) was used to resolve single cells and characterize their lineage, gut tropism, and function. CyTOF panels with cell lineage antigens, functional antigens, trafficking molecules, and phosphoproteins based on biological and literature insight were designed to examine leukocytes broadly using both targeted and unbiased analyses. Studies of blood or paired blood and tissue samples from 68 subjects were then conducted. Blood signatures of disease phenotype, many of which were represented by gut tropic cell populations, were identified. A robust multiparameter generalized linear model to classify patients by disease diagnosis (CD or UC), suggesting that non-invasive blood-based assays could be introduced clinically to reduce the delay, risk, discomfort, and cost associated with more invasive procedures, was produced.

Methods

Systematic Search and Dataset Criteria
Patient Samples

All blood and tissue samples were collected under provision of the Stanford Institutional Review Board. Subjects age 18 to 75 with an IBD-specializing gastroenterologist-confirmed diagnosis of inflammatory bowel disease (except healthy controls) were recruited, excluding those who were pregnant, had other autoimmune or inflammatory diseases (except for extra-intestinal manifestations of IBD), had a malignancy, had an active infection at the time of enrollment, had undergone surgery within one month of enrollment, had a blood transfusion within one month of enrollment, had received an organ or bone marrow transplant, or were unable to provide informed consent. All clinical data for subjects was current at the time of sample collection. Flare was determined by IBD-specializing physicians for standard of care and intent to treat using all available information, including bloodwork, clinical assessments, patient history, and/or endoscopy. When available (for most patients) recent endoscopy reports were reviewed to confirm disease state. Disease activity was defined using HBI (CD) and Partial Mayo (UC) scores.

Blood samples were collected by standard of care venipuncture; three vacutainers with sodium heparin (BD cat. #366480) were filled with blood and kept at room temperature until processing, which occurred within two hours. Tissue samples were collected during standard of care endoscopic procedures (within two hours of paired blood sample collection) using biopsy forceps rinsed in sterile saline to remove any residual formalin. Two to four tissue bites per site were collected and deposited in 3 mL of sterile PBS without calcium or magnesium in a 5 mL Eppendorf tube and kept at room temperature if processed within 30 minutes or kept on ice if processed within 2 hours. Biopsies were excluded if they were sampled from sites exposed to methylene blue during endoscopic procedures. Samples from inflamed and uninflamed tissues were initially identified by the endoscopist and subsequently confirmed by a blinded pathologist.

Blood Leukocyte Isolation and Cryopreservation

Blood was centrifuged in vacutainers used for collection at 2000 RPM for 10 minutes. Plasma was aspirated from the top and frozen at −80° C. in 1 mL aliquots in cryovials (Thermo Fisher Scientific cat. #375418) using a freeze controller (Bel-Art Products cat. #F18844-0000) pre-chilled to −4° C. according to the manufacturer's instructions. The remaining blood was diluted 1:1 in PBS without calcium or magnesium, layered over 15 mL of Ficoll-Paque (GE Healthcare cat. #17-1440-03) in an Accuspin tube (Sigma-Aldrich cat. #A2055), and centrifuged at 2000 RPM for 20 minutes at 21° C. with acceleration at five and break at zero. The buffy coat leukocyte layer was collected and washed twice in 50 mL PBS without calcium or magnesium by centrifuging at 2000 RPM for 10 minutes. Cells were counted, washed again, and resuspended in Recovery Cell Culture Freezing Medium (Thermo Fisher Scientific cat. #12648010) at $3.5\text{-}10 \times 10^6$ cells/mL in 1 mL aliquots, transferred to a freeze controller (Bel-Art Products cat. #F18844-0000) pre-chilled to −4° C. according to the manufacturer's instructions, stored at −80° C. for one to seven days, and then transferred to liquid nitrogen for storage.

Tissue Leukocyte Isolation and Cryopreservation

Combined biopsy bite tissue samples from the same site were washed in HBSS without calcium or magnesium supplemented with 2% BSA and then transferred to 5 mL of RPMI with HEPES, 5% BSA, collagenase IV at 0.7 mg/mL (Sigma-Aldrich cat. #C5138), and DNase I at 50 μg/mL (Worhington Biochemical cat. #LS002060) at 37° C. on a magnetic stirrer at 400 RPM for 40 minutes in a small glass jar with a magnetic stirrer. The cell suspension was strained through a 100 μm filter (Falcon cat. #352360), quenched with 5 mL of RPMI with HEPES and 5% BSA, centrifuged at 560 g for 10 minutes, and kept on ice. The remaining undigested tissue was again resuspended in 5 mL of RPMI with HEPES, 5% BSA, collagenase IV at 0.7 mg/mL (Sigma-Aldrich cat. #C5138), and DNase I at 50 μg/mL (Worhington Biochemical cat. #LS002060) at 37° C. on a magnetic stirrer at 400 RPM for 40 minutes in a small glass jar with a magnetic stirrer. The material was again strained through a 100 μm filter (Falcon cat. #352360), quenched with 5 mL of RPMI with HEPES and 5% BSA, and centrifuged at 560 g for 10 minutes. The combined cell suspensions were then resuspended in 8 mL of 40% Percoll, which was made by preparing a mixture of 10% 10×PBS and 90% Percoll (GE Healthcare cat. #17-0891-01) and then diluting this in RPMI with HEPES and 5% BSA. The 40% Percoll cell suspension was overlaid on 2 mL of 80% Percoll (prepared in a manner analogous to that previously described for 40%), centrifuged at 560 g for 20 minutes with acceleration of four and break of one at room temperature. The buffy coat leukocyte layer was collected and washed in 15 mL of RPMI with HEPES and 5% BSA. Cells were counted, washed again, resuspended in 500 μL of Recovery Cell Culture Freezing Medium (Thermo Fisher Scientific cat. #12648010) per tissue sample site, transferred to a freeze controller (Bel-Art Products cat. #F18844-0000) pre-chilled to −4° C. according to the manufacturer's instructions, stored at −80° C. for one to seven days, and then transferred to liquid nitrogen for storage.

Mass Cytometry

Phospho CyTOF was conducted at the Stanford Human Immune Monitoring Center using viably cryopreserved leukocyte samples according to published methods[54], unless otherwise noted, in batches of 10-20 samples per day on the same Helios instrument using the same operator. All antibody conjugates were validated for accurate detection of their respective antigens and to ensure minimal isotope spillover by the Stanford Human Immune Monitoring Center and in the literature using flow cytometry with antibody clones and mass cytometry with antibody-metal conjugates (see table below). Beads (Fluidigm cat. #201078) were spiked into each sample for subsequent normalization using the Helios instrument software, and no cell stimulation or barcoding were used.

| Metal | Marker | Clone | Source | Catalog No. |
|---|---|---|---|---|
| 140 Ca | Beads | n/a | Fluidigm | 20107B |
| 141Pr | CD20 | 2H7 | BioLegend, Fluidigm | 302343, 201141A |
| 142Nd | CD19 | HIB19 | Fluidigm | 3142001B |
| 143Nd | CD5 | UCHT2 | Fluidigm | 3143007B |
| 144Nd | pPLCγ2 [Y759] | K86-889.37 | Fluidigm | 3144015A |
| 145Nd | CD4 | RPA-T4 | Fluidigm | 3145001B |
| 146Nd | IgC | IA6-2 | Fluidigm | 3148006B |
| 147Nd | pSTAT5 [Y594] | 47 | Fluidigm | 3150005A |
| 148Nd | IgA | Polyclonal | Fluidigm | 3140007B |
| 149Sm | CD25 (IL-2R) | 2A3 | Fluidigm | 3149019B |
| 150Nd | CD43 | 84-3C1 | Fluidigm | 31500068 |
| 151Eu | CD123 (IL-3R) | 6H8 | Fluidigm | 31510018 |
| 152Sm | Akt [S473] | D9E | Fluidigm | 3152005A |
| 153Eu | pSTAT1 [Y701] | 4a | Fluidigm | 3153005A |
| 154Sm | GPR 15-PE | 373004 | BioLegend, Fluidigm | Custom, 201154A |
| 155Gd | CD27 | L128 | Fluidigm | 2155001B |
| 156Gd | p-p38 [T18G/Y182] | D3F9 | Fluidigm | 3156002A |
| 157Gd | CD24 | ML-5 | BioLegend and Standard HIMC | 311127, custom |
| 158Gd | pSTAT3 [Y705] | 4 | Fluidigm | 315600SA |
| 159Tb | pMAPKAPK2 | 2767 | Fluidigm | 3159010GA |
| 160Gd | CD14 | MSE2 | Fluidigm | 3160001B |
| 161Dy | CCR9 | L053EB | BioLegend, Fluidigm | 358902, 201161A |
| 162Dy | CD11c | Bu15 | Fluidigm | 3162006B |
| 163Dy | CD56 (NCAM) | NCAM16.2 | Fluidigm | 3163007B |
| 164Dy | IκBa | L35A5 | Fluidigm | 3164004A |
| 165Hc | pCBEB [S 133] | 87G3 | Fluidigm | 3165009A |
| 166Er | CD16 | B73.1 | Stanford HIMC | Custom |
| 167Er | CD38 | HIT2 | Fluidigm | 3167001B |
| 168Er | CD8a | SK1 | Fluidigm | 3168802B |
| 169Tm | CCR1 | 5F10B29 | BioLegend, Fluidigm | 382902, 201169A |
| 170Er | CD3 | UCl4T1 | Fluidigm | 3170001B |
| 171Yb | pERK 1/2 [T202/Y204] | D13.14.4E | Fluidigm | 3171010A |
| 172Yb | CD45RO | UCHL1 | BioLegend, Fluidigm | 304239, 201172A |
| 173Yb | α4β7 | AcH | NIH AIDS Reagent Program, Fluidigm | 11718, 201173A |
| 174Yb | HLA-DR | L243 | Fluidigm | 3174001B |
| 175Lu | pS6 | N7548 | Fluidigm | 3175009A |

-continued

| Metal | Marker | Clone | Source | Catalog No. |
|---|---|---|---|---|
| 176Yb | CD127 (IL-7Ra) | AG19DS | Fluidigm | 3176004B |
| 209Bl | CD11b | ICRF44 | Fluidigm | 3209003B |
| 191Ir | DNA | n/a | Fluidigm | 201192B |
| 193Ir | DNA | n/a | Fluidigm | 201192B |
| 195Pt | Cisplatin viability (live/dead) | n/a | Fluidigm | 201064 |
| 89Y | CD45 | HI30 | Fluidigm | 3089003B |
| 140 Ce | Beads | n/a | Fluidigm | 251078 |
| 141Pt | CD20 | 2H7 | BioLegend, Fluidigm | 302343, 291141A |
| 142Nd | CD19 | HIB19 | Fluidigm | 3142001B |
| 143Nd | HLA-DR | L243 | Fluidigm | 3143013B |
| 144Nd | pPLCY2 [Y759] | K86-889-37 | Fluidigm | 3144015A |
| 145Nd | CD4 | RPA-T4 | Fluidigm | 3145001B |
| 146Nd | IgD | IA5-2 | Fluidigm | 3146006B |
| 147Nd | pSTAT5 [Y694] | 47 | Fluidigm | 3150005A |
| 148Nd | IgA | Polyclonal | Fluidigm | 3148007B |
| 149Sm | CD25 (IL-2R) | 2A3 | Fluidigm | 3149010B |
| 150Nd | CD43 | 84-3C1 | Fluidigm | 3150000B |
| 151Eu | CD123 (IL-3R) | 6H6 | Fluidigm | 3151001B |
| 152Sm | TCRγδ | 11F2 | Fluidigm | 3152008B |
| 153Eu | pSTAT1 [Y701] | 4a | Fluidigm | 3153005A |
| 154Sm | GPR15-PE | 373004 | BioLegend, Fluidigm | Custom, 201154A |
| 155Gd | CD27 | L126 | Fluidigm | 3155001B |
| 156Gd | p-p38 (T180/Y182) | D3F9 | Fluidigm | 3156002A |
| 157Gd | CD24 | ML-5 | BioLegend and Stanford HIMC | 311127, custom |
| 158Gd | pSTAT3 [Y705] | 4 | Fluidigm | 3158005A |
| 159Tb | pMAPKAPK2 | 27B7 | Fluidigm | 3159010A |
| 160Gd | CD14 | M5E2 | Fluidigm | 3180001B |
| 161Dy | CCR9 | L053E8 | BioLegend, Fluidigm | 358902, 201161A |
| 162Dy | CD11c | Bu16 | Fluidigm | 3162005B |
| 163Dy | CD56 (NCAM) | NCAM16.2 | Fluidigm | 3163007B |
| 164Dy | IκBa | L35A5 | Fluidigm | 3164004A |
| 165Ho | pCREB [8133] | 87G3 | Fluidigm | 3165009A |
| 166Er | CD16 | B73.1 | Stanford HIMC | Custom |
| 167Er | CD38 | HIT2 | Fluidigm | 3167001B |
| 168Er | CD8a | SK1 | Fluidigm | 3168002B |
| 169Tm | CCR1 | 5F10B29 | BioLegend, Fluidigm | 362902, 281169A |
| 170Er | CD3 | UCHT1 | Fluidigm | 3170001B |
| 171Yb | CXCR5 | RF8B2 | Fluidigm | 3171014B |
| 172Yb | CD45RO | UCHL1 | BioLegend, Fluidigm | 364239, 201172A |
| 173Yb | α4β7 | Act1 | NIH AIDS Reagent Program, Fluidigm | 11718, 201173A |
| 174Yb | CD94 | HP-3D9 | Fluidigm | 3174015B |
| 175Lu | PD-1 | EH12.2H7 | Fluidigm | 3175008B |
| 176Yb | CD127 (IL-7Ra) | A019D5 | Fluidigm | 3176004B |
| 209Bl | CD11b | ICRF44 | Fluidigm | 3209003B |
| 191Ir | DNA | n/a | Fluidigm | 201192B |
| 190Ir | DNA | n/a | Fluidigm | 201192B |
| 195Pt | Cisptatin viability (live/dead) | n/a | Fluidigm | 201064 |

In brief, cells were thawed, washed twice in 10 mL of complete RPMI with 1:10,000 benzonase (Pierce Antibodies cat. #88701), and washed again in complete RPMI. Cells were counted and 1×10⁶ live cells were used for staining; for tissue samples with less than 1×10⁶ live cells recovered, thawed mouse splenocytes (processed as described above for human blood) were spiked in to reach 1×10⁶ live cells per sample. Cells were transferred to deep well plates, washed in RPMI and then incubated for 3 minutes at room temperature in 100 µL of 1:5000 cisplatin live/dead stain (Fluidigm cat. #201064) in RPMI. Cells were washed twice with complete RPMI, resuspended in 200 µL complete RPMI, and rested for 1 hour at 37° C. in a CO₂ incubator. For surface staining, cells were washed with CyFACS buffer, stained with anti-α4β7 antibody in 25 µL total volume per sample for 20 minutes at room temperature, washed twice with CyFACS, and fixed with 200 µL of 2% PFA in PBS for 10 minutes at room temperature. Cells were washed twice with 1 mL of CyFACS per well and centrifuged at 2000 RPM for 8 minutes at 4° C. Samples were stained with surface antibody cocktails in a total staining volume of 20 µL per sample for 30 minutes at room temperature, washed twice with 1 mL of CyFACS buffer per well, and centrifuged at 974 g for 8 minutes at 4° C. Cells were fixed again in 100 µL of 4% PFA in PBS for 10 minutes at room temperature, washed with PBS, permeabilized with 600 µL of −20° C. methanol per sample, and stored overnight at −80° C. The next day, samples were resuspended in 1 mL CyFACS buffer and centrifuged at 974 g for 10 minutes at 4° C., and then washed again in PBS. Samples were stained with intracellular antibody cocktails in a total staining volume of 20 µL per sample for 30 minutes at room temperature, washed in 1 mL of CyPBS, and 300 µL of Ir-intercalator (Fluidigm cat. #201192B) diluted according to the manufacturer's instructions was added to each sample for 20 minutes at room temperature. Samples were washed once with PBS, twice with water, spiked with beads according to the manufacturer's instructions, and then analyzed on a Helios instrument. Approximately 100,000 or all possible events (whichever lower) were acquired for each sample.

Flow Cytometry

Flow cytometry was conducted at the Stanford Shared FACS Facility (SSFF) on a BD LSRII instrument in accordance with standard methods. In brief, cells were thawed, washed once in complete RPMI, incubated in 1 mL complete RPMI with 2.5 mM MgCl₂ (ThermoFisher cat. #AM9530G)

and 0.5 mg/mL DNase I (Worthington Biochemical cat. #LS002060) for 10 minutes at room temperature, and washed in 10 mL of complete RPMI. Cells were counted and $1 \times 10^6$ or $2 \times 10^6$ live cells were aliquoted for staining. Cells were washed with FACS buffer (HBSS without calcium or magnesium and supplemented with 2% BSA). Cells were resuspended in 100 µL of 1:500 Zombie Green fixable viability stain (BioLegend cat. #423111) in PBS without calcium or magnesium and incubated for 15 minutes at room temperature in the dark. Cells were washed with FACS buffer, resuspended in a master mix of fluorochrome-conjugated antibodies (Supplemental FIG. 4B) using the supplier-recommended 5 µL of each antibody per $1 \times 10^6$ cells, and incubated for 30 minutes at 4 C in the dark. Cells were washed with FACS buffer, resuspended in 100 µL of FACS buffer, and kept on ice in the dark until sample analysis. Approximately $1 \times 10^6$ or all possible events (whichever lower) were acquired for each sample. For single color compensation controls, one drop of negative control and one drop of anti-mouse compensation beads (BD cat. #552843) were incubated in 100 µL of FACS buffer and 5 µL of antibody for 15 minutes at room temperature in the dark and then kept on ice in the dark until analysis.

Data Analysis

Bead normalized sample files were obtained from the Helios instrument using on-board software. FlowJo was used for cleaning up files, concatenating files, and calculating manual gates and statistics. Doublets were carefully gated out in all samples. Although several reported cell subpopulations are not canonical populations, they have been reported in the literature using flow cytometry. VorteX[55] was used to find the optimal cluster number for use in subsequent analyses. Cytobank was used to perform viSNE, CITRUS, and Spade analyses. viSNE analyses were run on live human single cells concatenated from individual samples by group. 5,000 events were randomly subsampled from each concatenated file, and clustering was run on all concatenated files in parallel using a random seed, 1000 iterations, perplexity of 30, and theta of 0.5. GraphPad PRISM 7 was used to plot some figures and conduct some targeted statistical tests, and Microsoft Excel was used for some basic data maneuvering. Morpheus (https://software-.broadinstitute.org/morpheus) was utilized for constructing heatmaps and Pearson correlation maps based on significant parameters selected using T-tests with 10,000 permutations and Benjamini and Hochberg FDR correction for multiple testing. R was used for additional statistical analyses (see below). There were three patients in cohort 1 and one patient in cohort 2 excluded from analyses involving trafficking receptors because they were treated with an α4β7 antagonist.

Statistics

All p-values were derived from two-tailed unpaired T-tests without adjustment for multiple testing unless otherwise noted. Most p-values were corrected for multiple testing as indicated using the BH FDR correction method in Morpheus (see above). When correcting for multiple testing manually, the p.adjust package with the BH correction method (also known as FDR) was used in R according to its documentation to account for the expected proportion of false discoveries amongst the rejected hypotheses. Correlation tests were based on Pearson correlations using cor.test in R according to its documentation. For paired blood and tissue correlations, each biopsy location was paired with blood from the same individual, and Pearson correlations were calculated for each pair. The mean value for tissue was used if there was more than one tissue sample from a given location. P-values varied with the number of samples in each subgroup being compared, as p.adjust incorporates the number of comparisons being made. Correlated parameters were eliminated if driven by an outlier or less than three data points. For receiver operating characteristic (ROC) analysis, generalized linear models (GLM) were constructed in R using the glm package according to its documentation using features significantly different between disease groups. GLMs were calculated for each individual parameter and then compared to a model including all significant parameters. For each ROC curve, the area under the curve and 95% confidence intervals were calculated using the ROCR package in R according to its documentation. Optimal cutoff values and associated sensitivity and specificity values for GLMs were calculated using the OptimalCutpoints package in R with the Youden index method according to its documentation. Analysis of covariance (ANCOVA) was performed using the aov package in R according to its documentation in order to test for significant correlation between each cellular parameter and age, sex (female=1; male=0), or age and sex.

Gene Expression Deconvolution

Gene expression deconvolution analyses were conducted according to published methods[23] using the immunoStates basis matrix for major cell lineages. Only major cell lineages were identifiable using this approach due to the availability of sorted cell gene expression data used in the basis matrix. In brief, the mean expression of each gene in the 312-gene matrix for major cell lineages was measured and deconvolution with support vector regression using the CIBERSORT algorithm[56] was performed. The resulting estimated cell type frequencies between classes were compared and subsequently the effect sizes were calculated. All datasets were downloaded from Gene Expression Omnibus (GEO, www.ncbi.nlm.nih.gov/geo/) using the MetaIntegrator package from CRAN[57].

Results

Blood and biopsy specimens from IBD patients were collected as part of an IBD registry and biobank at Stanford University (FIG. 1 A). 68 subjects with gastroenterologist-confirmed IBD diagnoses were selected and healthy controls (HC) were matched for this study (FIG. 6), divided into a cohort of blood samples from 56 subjects (cohort 1) and a cohort of paired blood and biopsy samples from 12 subjects (cohort 2). For each cohort, disease group demographics were matched as best as possible for sex and reports of extra-intestinal manifestations (FIG. 6). There was no significant difference in disease state proportions (flare/remission for cohort 1), sex, age, age at onset, disease duration, reports of extra-intestinal manifestations, or tissue state proportions (inflamed/uninflamed for cohort 2) between CD and UC patients by cohort (FIG. 6). Thus, it was unnecessary to adjust the data based on these parameters. Disease phenotype characteristics were specific to each diagnosis and could not be matched. IBD samples included those from subjects in clinical remission or in clinical flare (as determined by IBD specialists; see Methods), and a spectrum of disease activity scores were represented in each group.

Viably cryopreserved leukocytes from blood and tissue were analyzed by CyTOF using specialized panels with surface and intracellular antigens. Four key trafficking molecules were used for gut tropism: α4β7, a pan-gut trafficking molecule and target of the therapeutic antibody vedolizumab[13]; CCR1, a trafficking molecule identified in GWAS studies and reported as a molecular marker of activity in CD[15,16]; CCR9, a lymphocyte trafficking molecule associated with tropism for the small intestine[13]; and GPR15, a T cell trafficking molecule that has been shown to be important for trafficking to the colon[13,17,18]. While the CyTOF panels included phosphoproteins and other functional markers, it was found in pilot studies that cell stimulation was unnecessary to resolve differences in phospho-signaling between sample groups.

A combination of unbiased and biased (targeted) analyses allowed the identification of novel and literature-consistent disease features within T cell, B cell, NK cell, DC, and monocyte compartments. This highlights potentially pathogenic abnormalities and signatures identified amongst subsets of IBD patients. Moreover, the data on trafficking receptors in tissue and blood sheds new light on local and peripheral immune responses since little is known about leukocyte trafficking to the gut in the human, especially in the context of this disease.

Blood Leukocytes Demonstrate Increased Heterogeneity in CD

Targeted analysis of CyTOF data was conducted by manually gating or calculating medians to compile 2,208 parameters per sample as well as unbiased analysis using viSNE, CITRUS and Spade algorithms. Coefficients of variation (CVs) for each targeted parameter were used as a proxy for population diversity between disease groups[19], supporting the clinical observation that CD includes a more heterogenous group of disease manifestations than UC (FIG. 1 B). Samples from CD patients in remission had significantly higher CVs than samples from UC patients in remission or healthy controls (HCs), suggesting greater heterogeneity in CD remission compared to UC remission and HCs. Samples from CD patients in flare appeared to have higher CVs but exhibited a much higher standard deviation and were not significantly different than CD remission, UC flare, or HCs, suggesting an overall increase in heterogeneity amongst samples from CD patients in flare. On the other hand, samples from UC patients in flare had lower standard deviations and significantly higher CVs than samples from UC patients in remission or HCs, suggesting distinct states of flare and remission in UC where flare is inherently more heterogeneous than remission regardless of disease diagnosis.

Gut-Homing Molecule Expression Distinguishes CD from UC

Manually calculated parameters were compared between all CD and UC blood samples in cohort 1, which revealed statistically significant differences in the abundance of CCR9$^+$GPR15$^+$ CD56$^+$ B cells and $\alpha 4\beta 7^+$CCR1$^+$ CD56$^+$ plasmablasts after correction for multiple testing (FIG. 1 C). These data show that gut tropic B cell subsets, including previously unreported CCR9 and GPR15 co-expressing cells, appear to be relevant for disease distinction. Although expression of CD56 (neural cell adhesion molecule) is typically associated with NK cells, the protein is also more broadly expressed on other leukocytes, with reports of its expression on activated B cells in lymphoma patients[20] and associated with T helper 1 (Th1) responses[21]. CD56 expression is consistent with elevated CD56$^+$ B cells and plasmablasts here in CD, where Th1 responses contribute to disease[22].

Additional hypothesis-driven tests were conducted based on biological insights, literature reports, and gene expression deconvolution analysis[23]. This approach revealed six more parameters in the blood significantly different between all CD and UC samples (FIG. 1 D), as well as four subsets significantly different for those in flare. The increase of basophils that were observed in CD compared to UC is consistent with gene expression deconvolution data. Moreover, median phospho-cyclic AMP-responsive element-binding protein (pCREB) expression by basophils was significantly higher in CD compared to UC, which is consistent with reports suggesting an association between CD disease activity and expression of total CREB in the blood[24] (FIG. 1 D). Circulating pDCs, $\alpha 4\beta 7^+$ mDCs, and memory effector CD4$^+$ T cells were also significantly increased in CD compared to UC (FIG. 1 D). IgD$^-$ CD27$^-$ B cells were significantly increased amongst total CD19$^+$ CD20$^+$ B cells in UC as compared to CD, suggesting an antigen-driven B cell response (FIG. 1 D). These CD27$^-$ memory B cells are generally larger and more granular than CD27$^-$IgD$^+$ naive B cells[25] and are also class-switched and somatically hyper-mutated[26]. Expansion of IgD$^-$CD27$^-$ B cells has been reported in systemic lupus erythematosus (SLE)[27], human immunodeficiency virus (HIV)[28,29], and rotavirus infection[30], but not in IBD. In summary, eight cellular features were identified from unbiased and targeted analyses that significantly differentiated all CD from all UC patients.

Blood Heterogeneity is Conserved in CD Flare and Remission

Figure 1E:
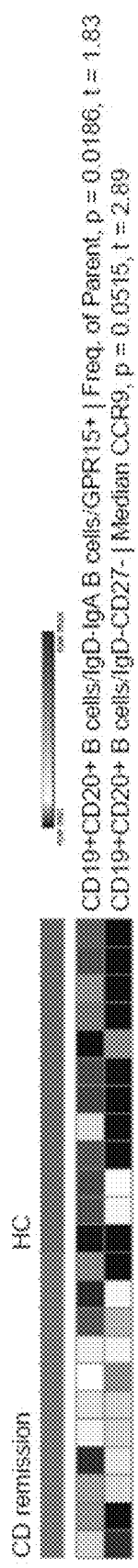
Figure 1F:
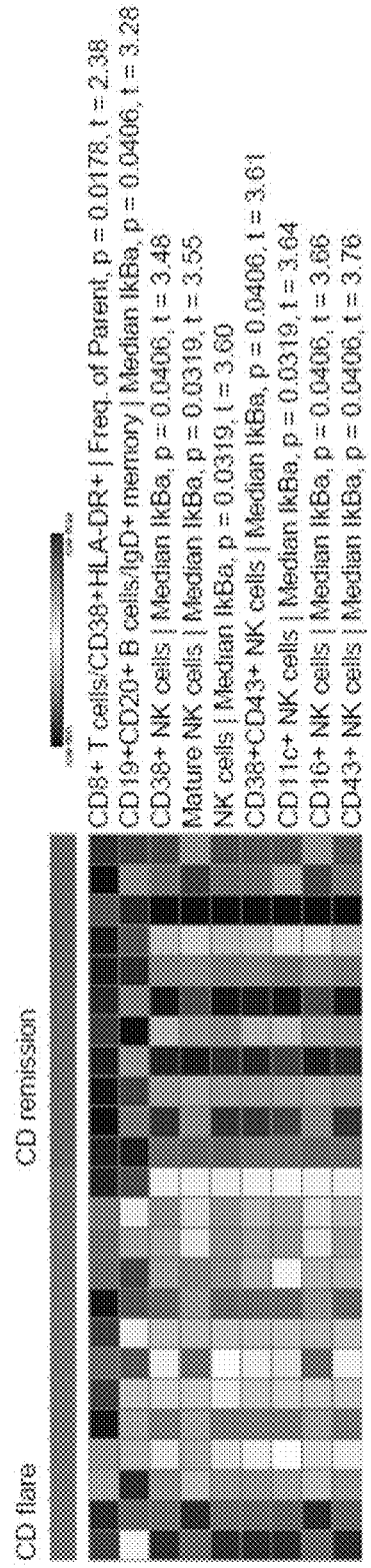

Next, IBD patients in remission were compared to healthy controls in order to identify persistent signatures of subclinical disease even in remission, as well as patients in flare to those in remission within each disease group to identify features specific to disease activity. Few significant trends were found across CD patients (FIGS. 1D and 1E). CD patients in remission compared to healthy controls revealed an increase in two gut tropic B cell populations identified by their GPR15 and CCR9 expression (FIG. 1 E). CD flare was then compared to remission and an increased abundance of highly activated CD38$^+$ HLA-DR$^+$ CD8 T cells were found (FIG. 1 F). CD flare was also associated with increased median total IκBα expression in IgD$^+$ memory B cells and multiple NK cell populations, indicating enhanced NF-κB inhibition in these cells. Comparison of CD flare to remission resulted in a speckled Pearson correlation heatmap based on vectors that represent all significant feature values for individual patients (shown on the left), indicating high relative heterogeneity amongst CD patients in both flare and remission (FIG. 1 F). Since each patient had a different baseline state, correlation coefficients allowed the detection of relative heterogeneity when it was not possible to discern absolute heterogeneity.

Figure 1G:
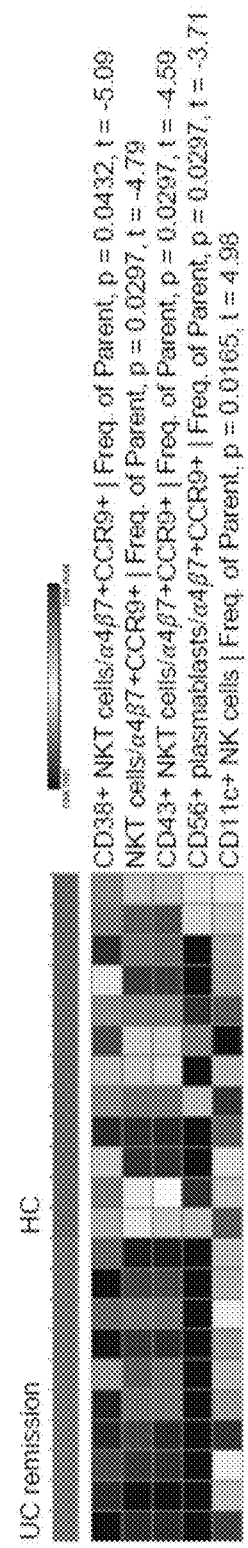
Figure 1H:
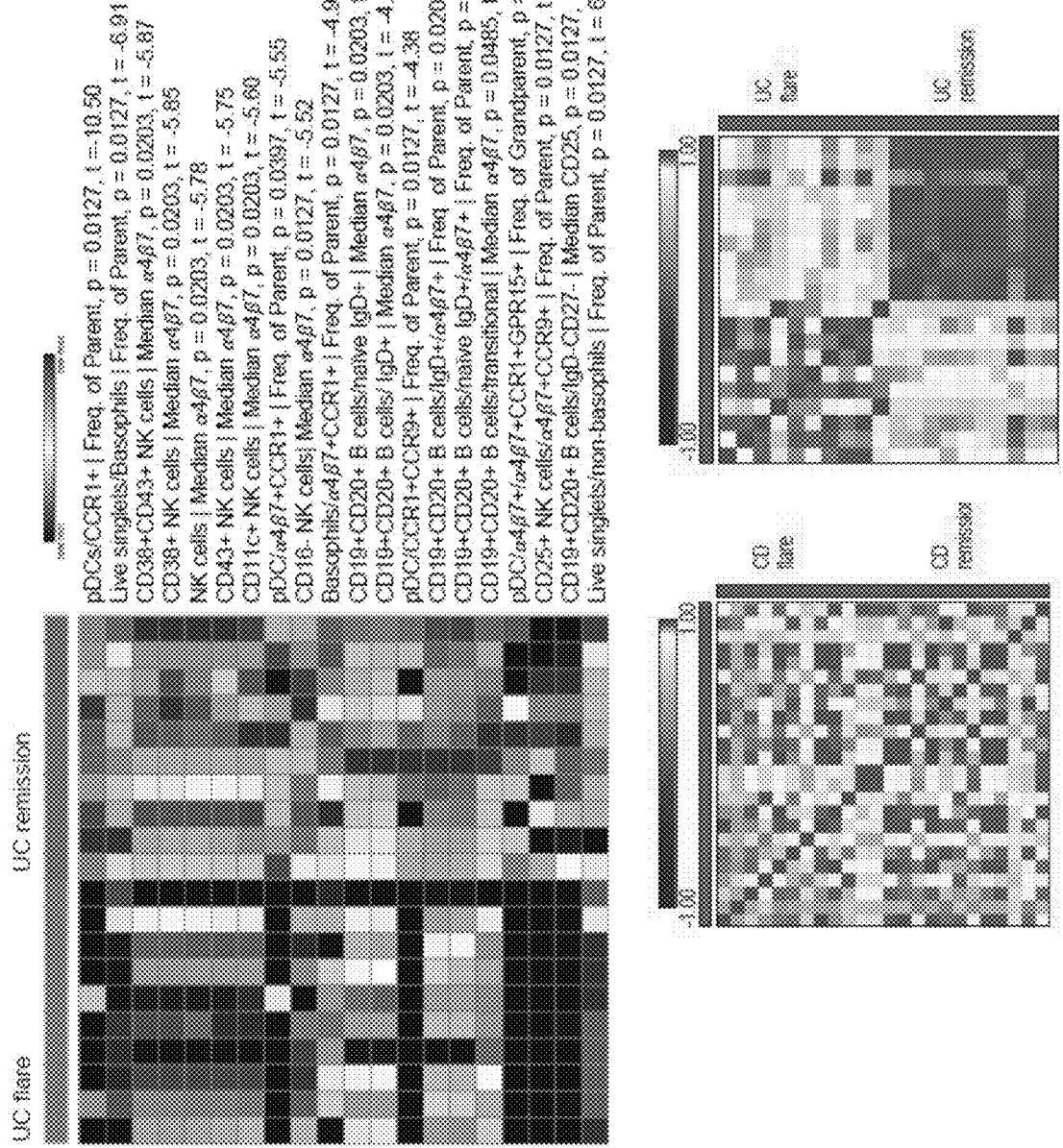
Figure 2A:
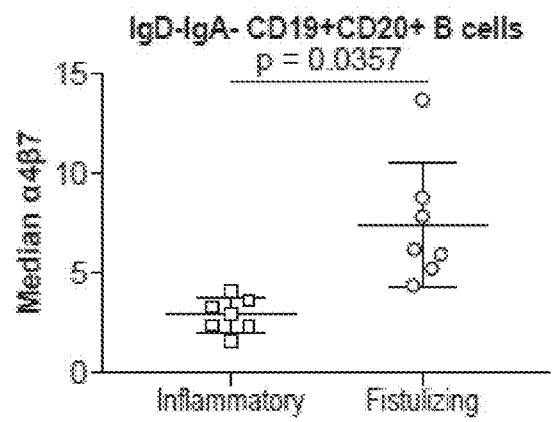
FIGS. 2A-2G depict features of leukocytes. Features significantly different between inflammatory (N=7) and fistulizing (N=7) CD (FIG. 2A), inflammatory (N=8) and stricturing (N=7) CD (FIG. 2B), fistulizing (N=7) and stricturing (N=7) CD (FIG. 2C), and the presence (N=7) and absence (N=16) of perianal disease in CD patients (FIG. 2D). Statistics: unpaired two-tailed Student's T-test using Morpheus (see Methods; $IgD^-IgA^-CD19^+CD20^+B$ cells [median $\alpha4\beta7$], t=3.69; $CD14^+$cells, t=−4.36; $IgD^-CD27^-B$ cells, t=3.91; $IgD^-IgA^-CD19^+CD20^+B$ cells [% of $CD19^+CD20^+$], t=4.38; $\alpha4\beta7^{+CCR}9^+HLA-DR^{lo}$ DCs, t=3.87; $\alpha4\beta7^+GPR15^+$Tregs, t=2.29). Center lines=mean; whiskers=standard deviation. Features that distinguish ileal (N=5) and colonic (N=4) CD (FIG. 2E), left-sided (N =6) and pan-colonic (N=11) UC (FIG. 2F), and colonic CD (N=4) and UC (N=18, or 20 for naïve $IgD^+B$ cells) (FIG. 2G) identified by hypothesis-driven testing. Statistics: unpaired two-tailed Student's T-test ($\alpha4\beta7^+CCR9^+$mature NK cells, t=3.18, df=7; $\alpha4\beta7^+CCR9^+CD45RO^+$NKT cells, t=7.15, df=7; $CCR9^+GPR15^+CD38^+HLA-DR^+CD4$ T cells, t=2.20, df=15; $GPR15^+$Tregs, t=2.20; df=20; naive $IgD^+B$ cells, t=2.18, df=22; $GPR15^+$naive $IgD^+B$ cells, t=2.23; df=20; $CCR9^+GPR15^+$plasmablasts, t=2.28; df=20). Center lines=mean; whiskers=standard deviation.
Figure 2B:
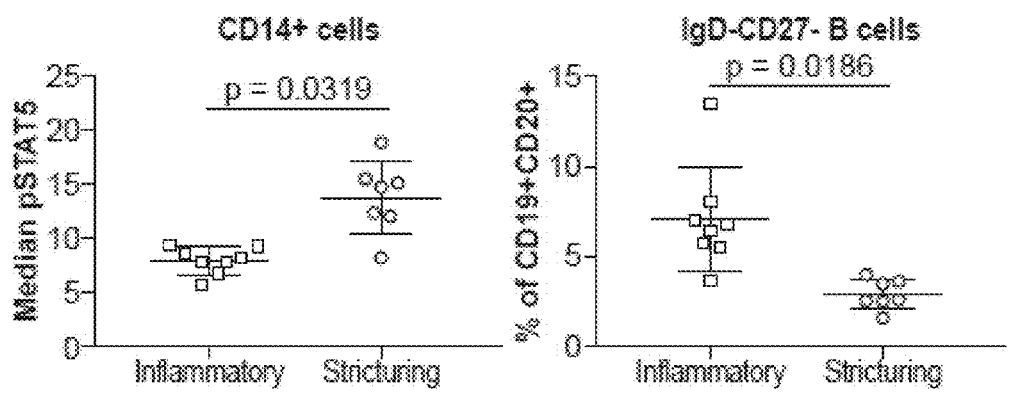
Figure 2C:
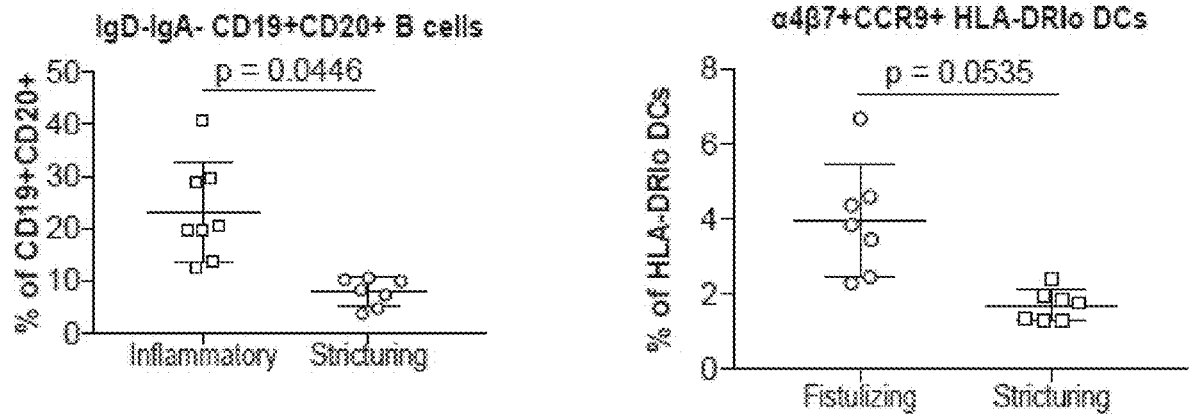
Figure 2D:
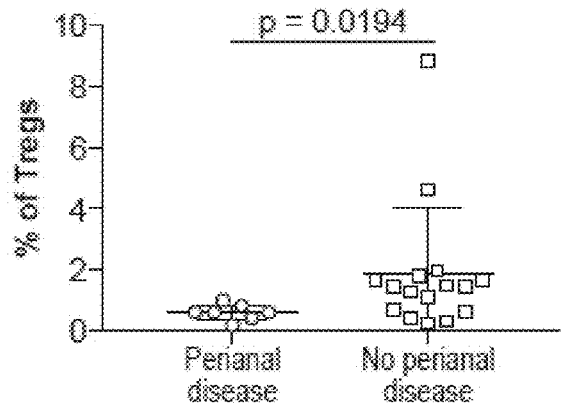
Figure 2E:
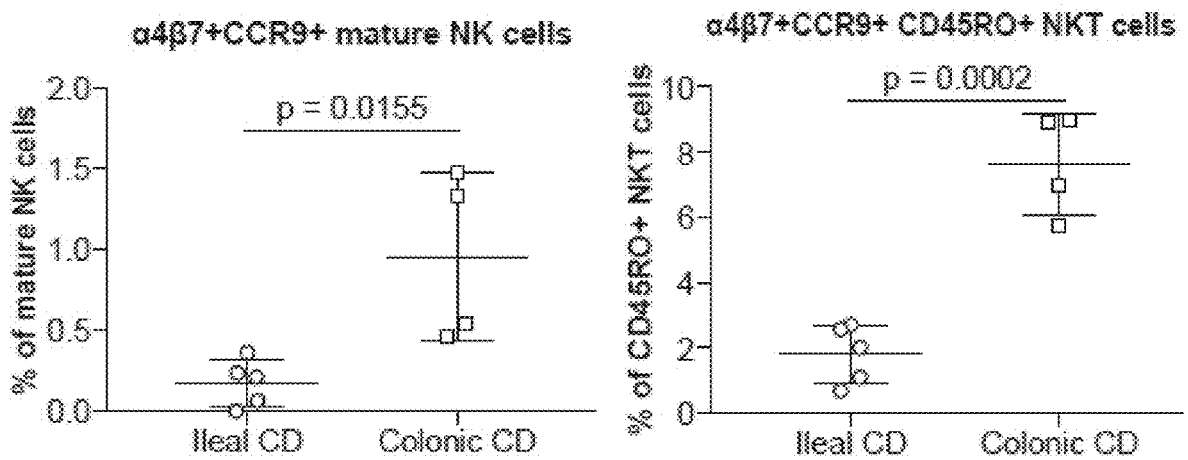
Figure 2F:
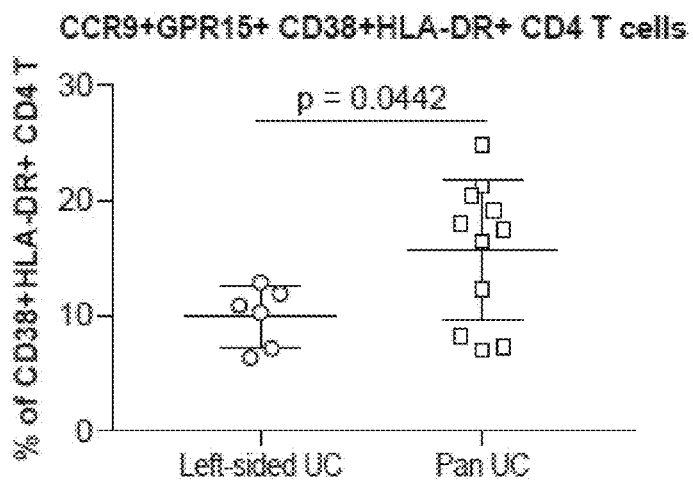
Figure 2G:
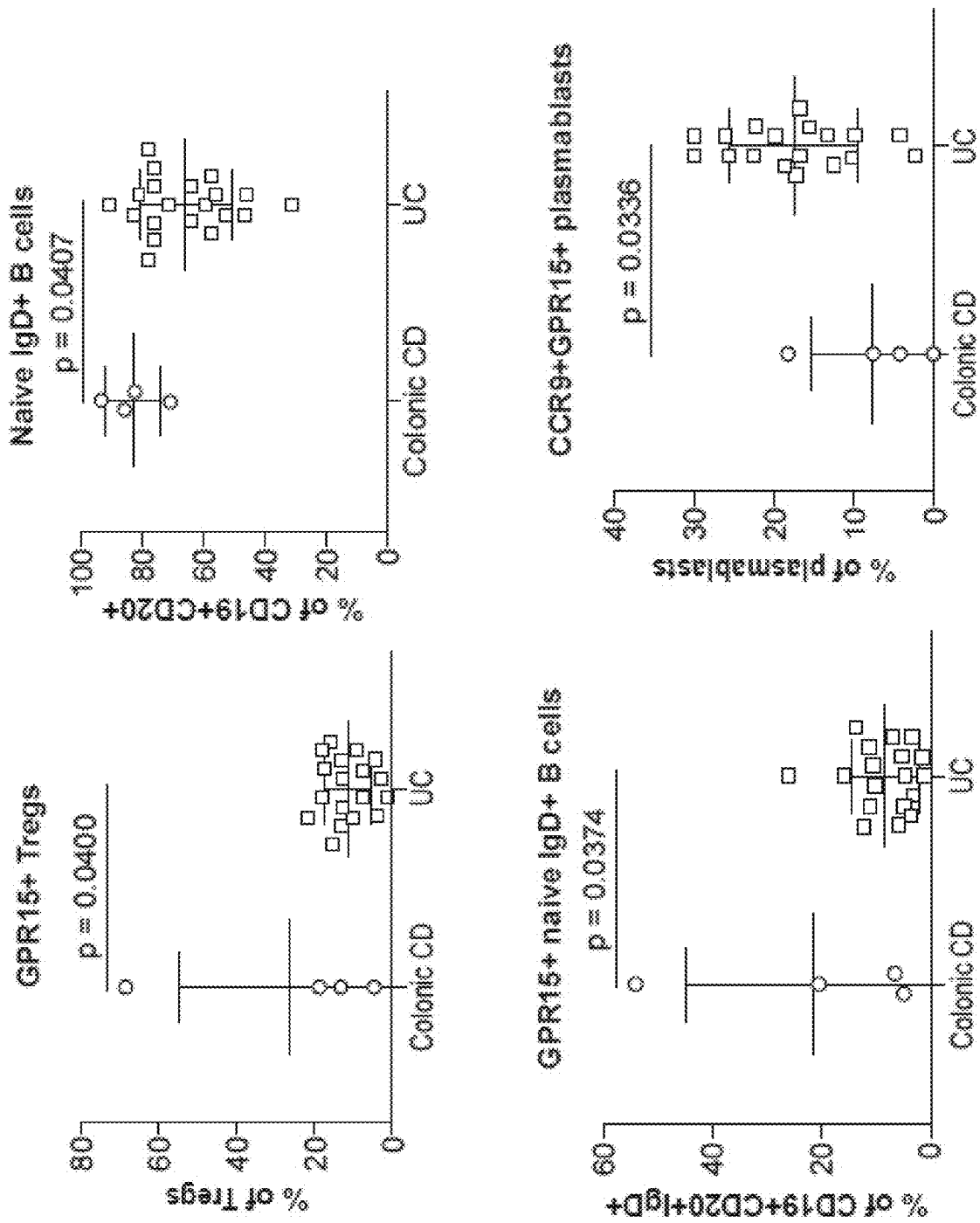
Figure 3A:
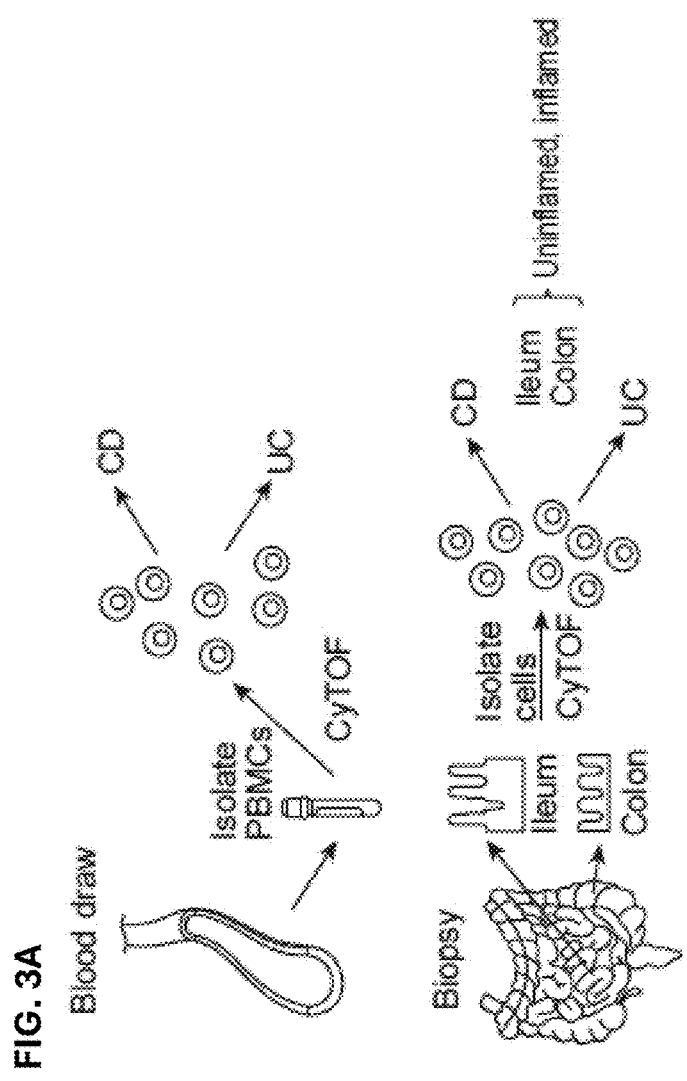
FIGS. 3A-3E depict a study schematic and an analysis of IBD tissue.
Figure 3B:
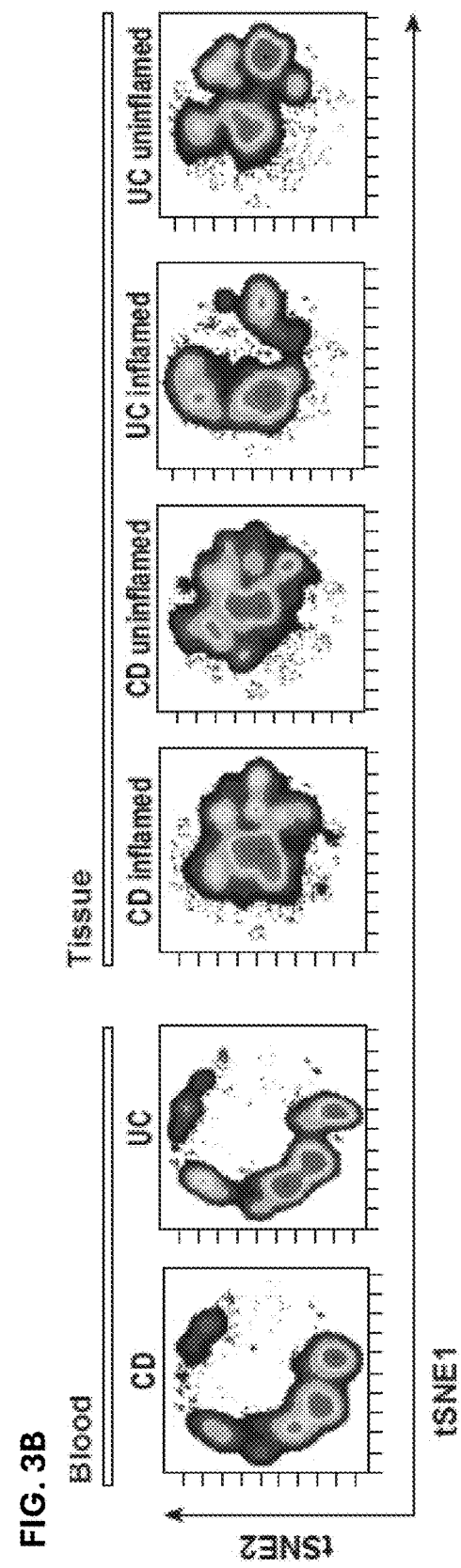
Figure 3C:
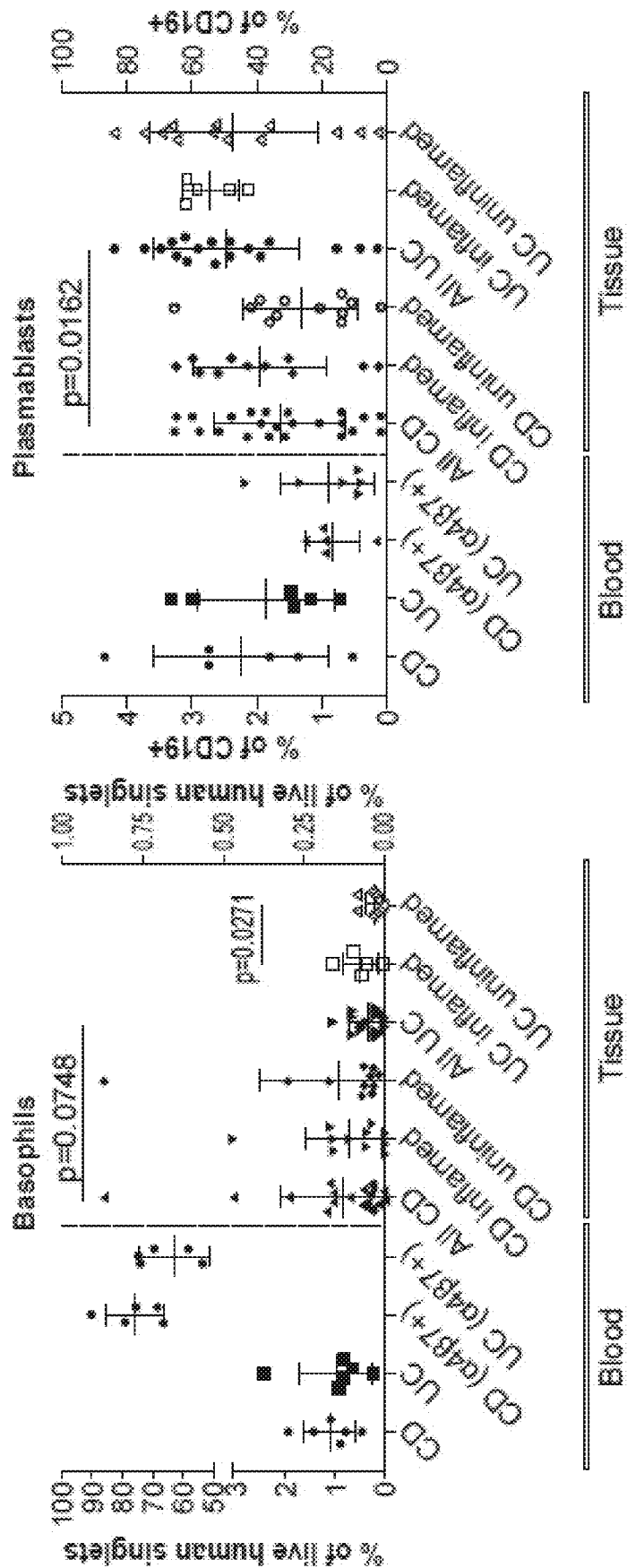
Figure 3D:
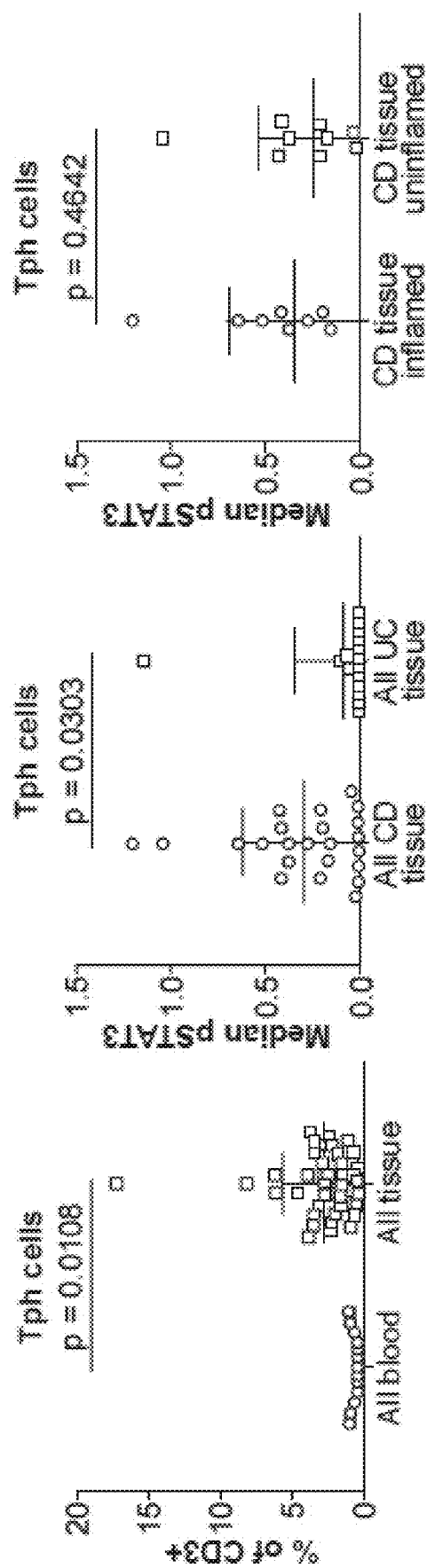
Figure 3E:
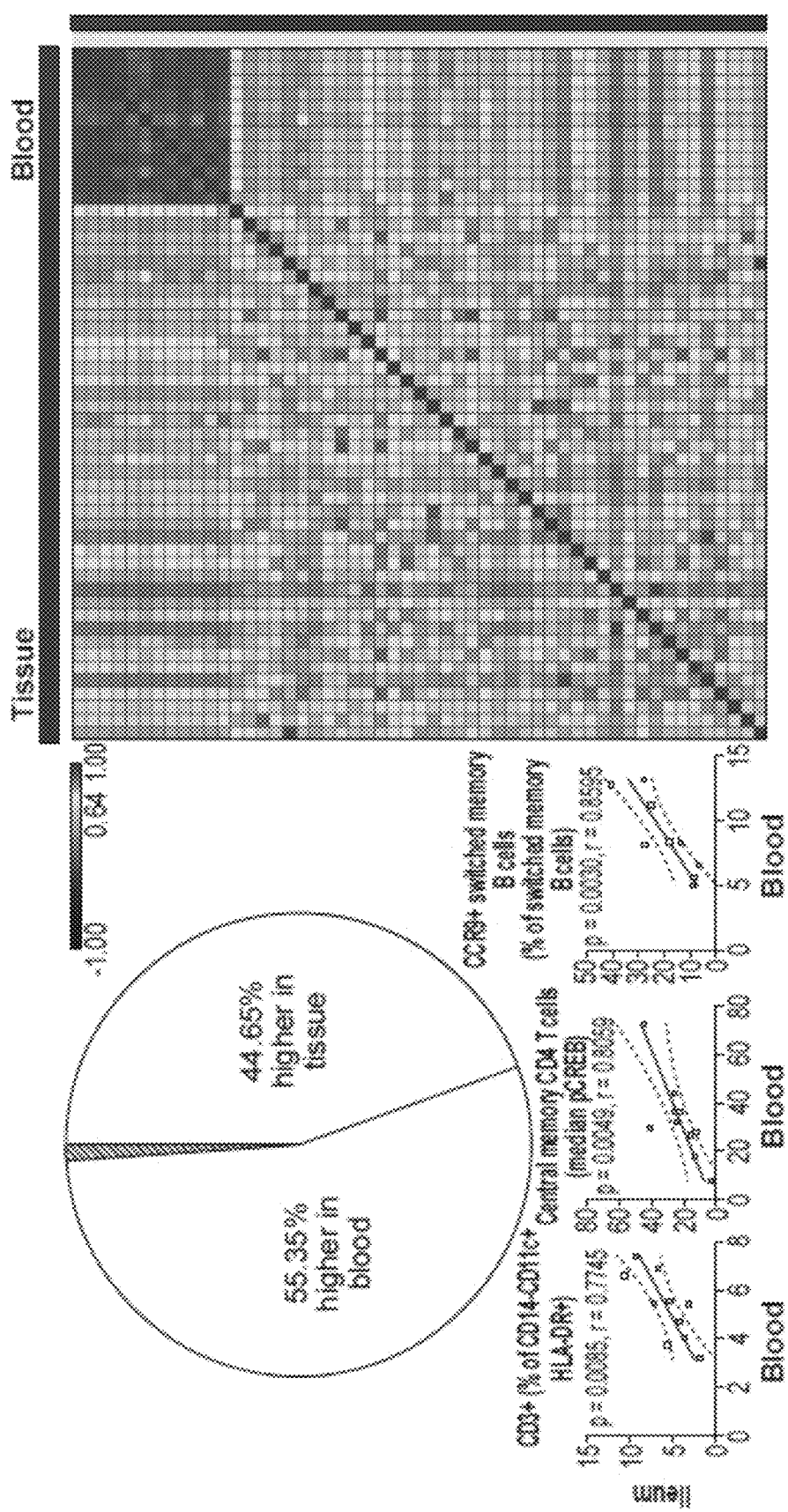

Unlike CD, more significant trends were found across UC patients in flare compared to remission (FIGS. 1G and 1H). Many of the cellular differences identified here also displayed gut tropism (FIG. 1 H), with significantly lower circulating $\alpha 4\beta 7^+$ cells in UC flare compared to remission, possibly because these cells localize to the tissue at higher levels during flare. The distinction from CD is further illustrated by the clearly delineated Pearson correlation map (FIG. 1 H), revealing a more homogeneous phenotype amongst UC remission patients and some convergence in flare as well.

In sum, these findings reinforce the observation of higher relative heterogeneity in CD, which is interestingly conserved amongst patients in remission and hinders separation into distinct flare or remission states based on the cellular markers used. Signatures identified relied on trafficking molecule expression, which supports the hypothesis that gut trafficking molecules allow for non-invasive monitoring of gut-specific immune responses in circulation.

Blood Leukocytes Reflect Clinical Stratifications of Disease

To identify cellular signatures in the blood responsible for disease heterogeneity, patients were separated into subsets by clinical features related to disease behavior and location. These clinical stratifications are important for disease monitoring and treatment. When CD patients with inflammatory versus fistulizing, inflammatory versus stricturing, and fistulizing versus stricturing disease (excluding two patients with history of both fistulizing and stricturing disease) were compared, one B cell signature (FIG. 2 A), three signatures of monocyte and B cell subsets (FIG. 2 B), and one DC signature (FIG. 2 C), were found, respectively, that distinguished these disease phenotypes. Interestingly, when CD patients with and without perianal disease were compared, a single difference in gut tropic Tregs (FIG. 2 D) was found. When CD patients with only ileal versus only colonic disease were compared, a significant decrease was noted in circulating $\alpha 4\beta 7^+ CCR9^+$ subpopulations of mature NK and CD45RO$^+$ NKT cells in ileal CD (FIG. 2 E). Since there were no significant differences in the abundance of total mature NK cells or total CD45RO$^+$ NKT cells, these differences in gut tropic subsets may suggest enhanced tissue localization in ileal CD, although there were not sufficient samples from patients with only ileal or only colonic CD in cohort 2 to investigate this further in the tissue. Unlike CD, UC was less heterogeneous in that only one highly activated GPR15 and CCR9 co-expressing CD4$^+$ T cell population was identified to be increased in pan-colonic as compared to left-sided disease (FIG. 2 F). In summary, gut-tropism related signatures in blood of IBD patients differentiated clinically distinct disease subsets, again highlighting the significance of trafficking molecules as a means of subsetting IBD phenotypes.

GPR15 Expression Distinguishes Colonic CD from UC

Crohn's disease can involve the colon in up to 60% of patients[31]. In a subset of these cases where disease is confined to the colon without involving other segments of the intestines, CD can be difficult to distinguish from UC[11]. This has important clinical implications, particularly when surgery is considered to treat the disease; surgery can be curative for UC (total colectomy) but not CD[32,33]. Thus, samples from patients with colonic CD (Crohn's colitis) were compared to UC. It was found that GPR15$^+$ Tregs, naive IgD$^+$ B cells, and GPR15$^+$ naive IgD$^+$ B cells were increased while CCR9$^+$GPR15$^+$ plasmablasts were decreased in colonic CD compared to UC (FIG. 2 G). Interestingly, three out of the four significantly different cell subsets were enriched for expression of the colon trafficking molecule GPR15[17,18], demonstrating that trafficking molecule expression in circulating immune cells facilitates complex disease differentiation. These four blood-based features have a potential to address the significant clinical need for differentiation of colonic CD from UC.

Blood and Tissue Cells are Largely but not Entirely Distinct

Few studies to date have utilized paired human blood and tissue samples to compare local and peripheral immune responses and characterize cell localization. Paired blood and biopsy samples from cohort 2 (FIG. 3 A; FIG. 3 B) were analyzed and two signatures previously identified in cohort 1 blood samples were found that were consistent with the tissue for distinguishing all CD and UC (FIG. 3 C). The reduction of basophil frequency that was observed in UC biopsies as compared to those from CD patients suggests an overall reduction of basophils in UC since this trend is consistent with findings in the blood (FIG. 3 C; FIG. 1 D). Moreover, tissue inflammation (initially identified by the endoscopist and confirmed by a blinded pathologist) appeared to decrease basophil frequency further in UC but not in CD (FIG. 3 C). Plasmablast frequency was significantly increased in UC tissue biopsies as compared to CD, which was also observed in the blood when comparing the frequency of $\alpha 4\beta 7^+$ plasmablasts between CD and UC patients in flare, suggesting an overall increase in abundance of plasmablasts in UC during flare (FIG. 3 C). Moreover, basophil and plasmablast signatures in the blood and tissue were consistent with predicted cell frequencies for basophils and plasma cells from gene expression deconvolution analyses that were performed on publicly available gene expression microarray datasets (plasmablasts were not identifiable via deconvolution, but the gating scheme for plasmablasts included plasma cells).

Because B cells and plasmablasts were highly represented amongst signatures identified, CD3$^+$CD4$^+$CD45RO$^+$ CXCR5$^-$PD-1$^+$ peripheral helper T (Tph) cells, which provide T cell help to B cells and plasmablasts in autoimmunity[34], were analyzed. No differences were found for Tph cell frequency in the blood between CD and UC patients in cohort 2, but significantly higher frequencies of Tph cells in tissue biopsies as compared to blood in both CD and UC (FIG. 3 D) were found. Although there was no difference in Tph cell frequency between CD and UC tissues, Tph cells had significantly higher median pSTAT3 expression in CD tissue samples compared to UC (FIG. 3 D). Median pSTAT3 expression by Tph cells was not different between inflamed and uninflamed tissue biopsies, suggesting that higher STAT3 phosphorylation in this population may be a hallmark of CD regardless of inflammation state (FIG. 3 D). In summary, Tph cell activation as indicated by pSTAT3 expression but not abundance was significantly higher in CD compared to UC tissue.

Blood and Tissue Leukocyte Correlations

Due to the expected differences in cell frequencies and median protein expression levels between blood and tissue, the goal was to identify blood-based correlates of tissue immune phenotypes. Since it was unlikely that marker expression or cell abundance would be equal between blood and tissue because of their distinct cellular environments, correlations between paired blood and tissue samples from ileum, colon, or rectum were examined to identify blood-based signatures reflective of the tissue. 795 of 2,145 targeted parameters were found to be significantly different between the blood and tissue derived from all IBD patients in cohort 2. Of these 795 significant cell frequencies and median protein expression levels, 55.35% were higher in the blood and 44.65% were higher in the tissue (FIG. 3 E). Pearson correlation based on this subset of significantly different features demonstrated relative homogeneity amongst blood samples compared to diversity in the tissue (FIG. 3 E), suggesting distinct immune responses across regions of the gut and inflammation states.

Since there were not sufficient samples to separate uninflamed and inflamed tissues by regions of the gut (ileum, colon, and rectum), the study focused on correlations between blood and biopsies from the ileum, colon, or rectum irrespective of inflammation status due to expected variation in immune composition by location and tissue type. Paired blood and tissue samples revealed that CD3$^+$ CD14$^-$CD11c$^+$ HLA-DR$^+$ cell frequency, median pCREB expression by central memory CD4 T cells, and CCR9$^+$ switched memory B cell frequency were correlated between blood and ileum (FIG. 3 E). There were no significant correlations between blood and colon or rectum samples in cohort 2 amongst the 2,145 parameters after correction for multiple testing, suggesting greater variance in the samples from these locations.

Surprisingly, all significant correlations identified here were positive; inverse correlations between blood and tissue indicative of cellular trafficking were not noted, possibly due to downregulation of trafficking receptors after homing to the tissue and/or by the single collection timepoint and location (biopsies also represent a very small area of the tissue) of the samples analyzed here. The relatively small number of paired blood and tissue used for correlation analyses after stratifying by tissue location could also account for the number of parameters significantly correlated (FIG. 3 E) after stringent correction for multiple testing.

Upon closer inspection of blood/tissue correlates without correction for multiple testing, median pCREB expression by $\alpha 4\beta 7^+$ central memory CD4 T cells was significantly higher in all CD compared to UC blood samples from cohort 1 and lower in inflamed CD compared to inflamed UC tissues in cohort 2, suggesting possible greater tissue localization in UC. CREB was reported to promote Th17 cell differentiation and inhibit iTreg survival, which is consistent with the importance of these cells in IBD pathogenesis[35-37]. CCR9$^+$ switched memory B cell frequency was significantly higher in the circulation of UC patients in flare as compared to those in remission in cohort 1. While CCR9$^+$ switched memory B cell frequency was not different in the blood of CD and UC patients, the frequency of these cells was significantly higher in UC compared to CD tissue samples. The increase of CCR9$^+$ B cells observed in the blood of UC patients in flare and in the tissue was surprising given the association of CCR9 with trafficking to the small intestine under homeostasis. This could reflect CCR9$^+$ B cells shown in mice to co-express CCR10 and also traffic to the colon, where the CCR10 ligand CCL28 is highly expressed[38,39]. The finding might also be related to inflammation or disease activity since elevated intestinal expression of the CCR9 ligand CCL25 (normally restricted to the small intestine) has been reported and correlated with inflammatory activity in UC patients[40], and CCR9 antagonists are being pursued for the treatment of ulcerative colitis[41]. In summary, specific cellular signatures were identified in the blood as a proxy for intestinal immune phenotypes relevant for disease group stratification.

Tissue Based Immune Signatures Distinguish CD and UC

Figure 4A:
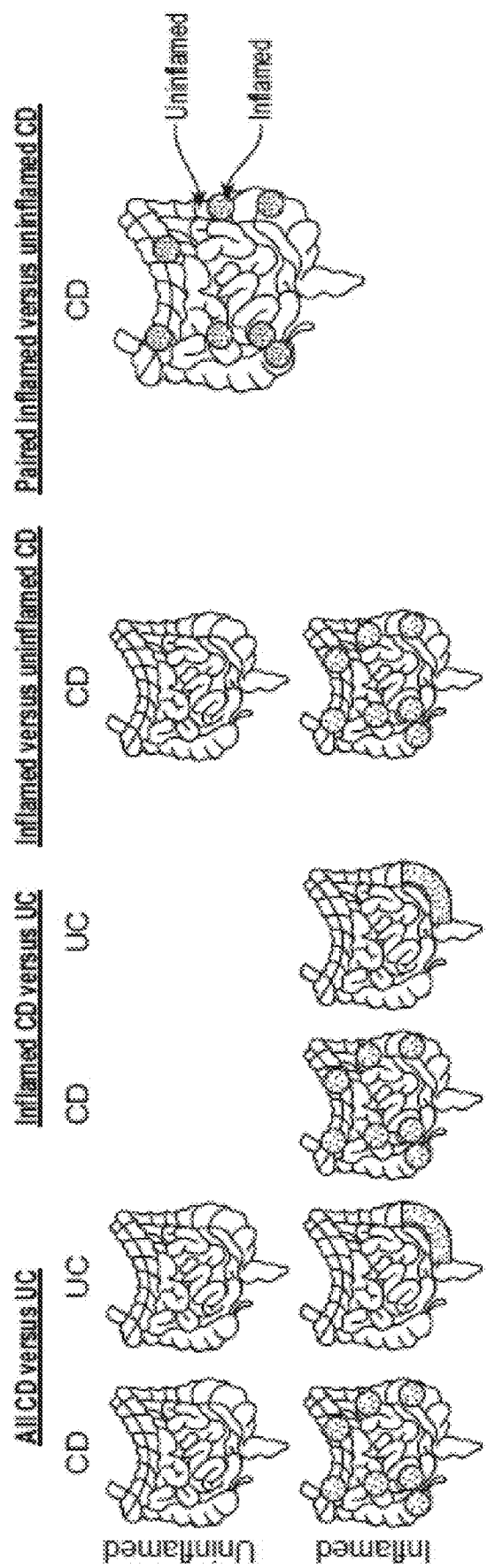
Figure 4E:
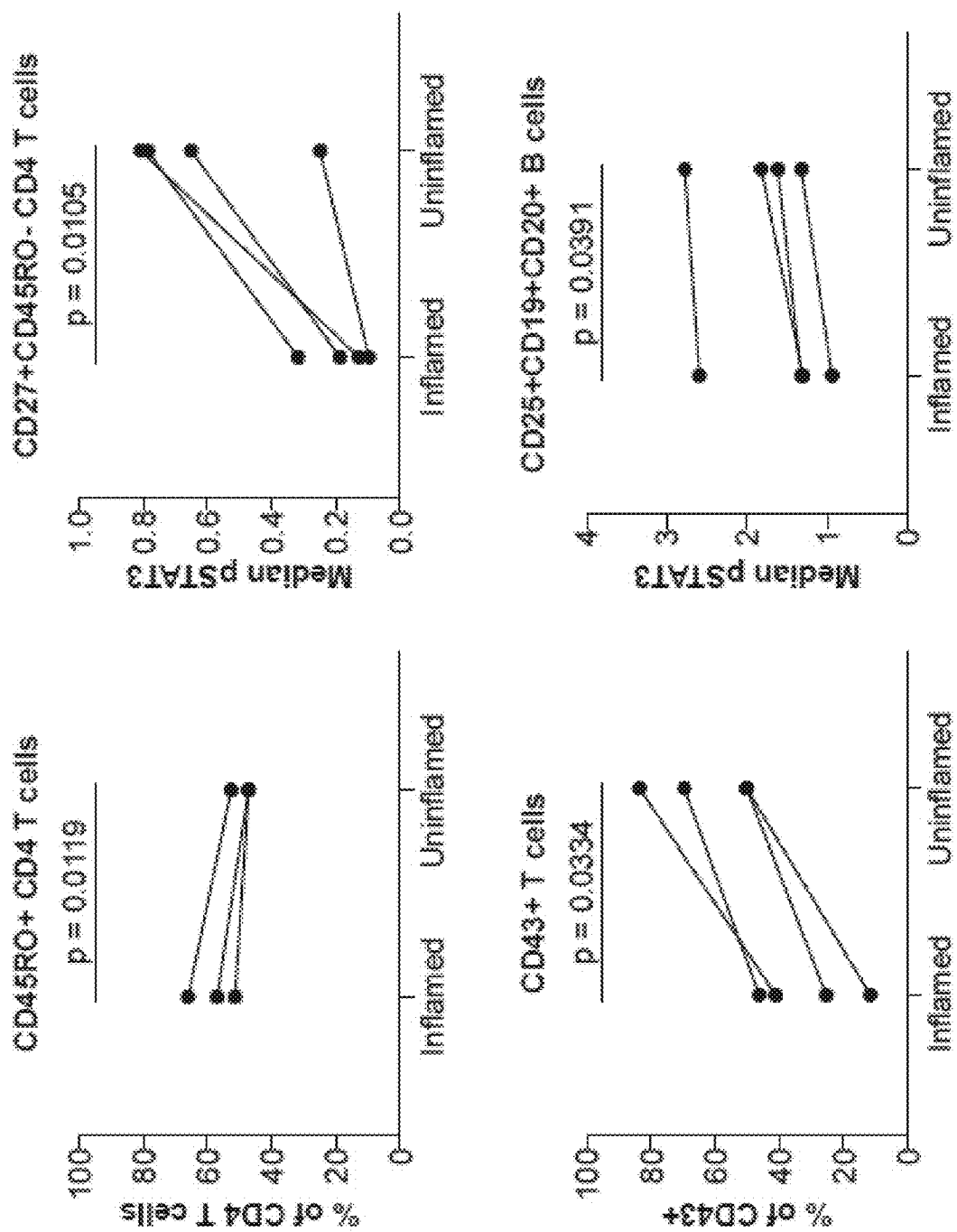

An analogous approach to that used on cohort 1 blood samples was taken for cohort 2 tissue samples to identify trends that distinguished all CD from UC regardless of tissue inflammation state (FIG. 4 A). After correction for multiple testing of all 2,145 manually computed parameters, 16 leukocyte signatures that were significantly different between all CD and UC tissue samples (FIG. 4 B) were found. Interestingly, activated subsets of NK and NKT cells with higher median pCREB and pSTAT3 were significantly elevated in CD as compared to UC tissues, which is consistent with trends identified earlier in the blood. When comparing only inflamed CD to UC tissues, 15 signatures were identified that were significantly different, and three gut tropic CD45RO$^+$ B cell populations (antigen experienced, previously reported in CD[42,43]) were specifically increased in inflamed CD tissue (FIG. 4 C). Interestingly, elevated pSTAT3 across multiple cell subsets in CD as compared to UC was the most conserved trend when comparing all tissue samples or only inflamed tissue samples, supporting both pro- and anti-inflammatory roles of STATS activation in IBD[44,45], although further studies are needed to understand its role in CD versus UC.

Activated Leukocytes Distinguish Tissue Inflammation in CD

Inflamed and uninflamed tissues from CD patients were compared to explore what factors might contribute to the discontinuous nature of inflamed regions in the CD gut in contrast to the continuous patterns observed in UC. Increased frequencies of CD45RO$^+$ B cell subsets and decreased frequencies of highly activated T cells, NK cells, and antigen-presenting B cells were significantly associated with inflammation in tissues from CD patients (FIG. 4 D). Since CD is frequently characterized by heterogeneous, patchy disease, four pairs of uninflamed and inflamed tissue from similar areas of the gut in CD patients were evaluated in an effort to make a more controlled comparison. Four significant differences between paired inflamed and uninflamed areas of the same anatomical region (i.e. ileum or colon) (FIG. 4 E) were identified. There were higher frequencies of CD45RO$^+$ memory CD4 T cells in paired inflamed tissues, which suggests chronic antigen-driven responses. Interestingly, there was greater median expression of pSTAT3 in CD27$^-$ CD45RO$^-$ CD4$^+$ T cells and higher frequencies of activated CD43$^+$ T cells in uninflamed tissues, which could reflect subclinical disease processes underway in uninflamed tissues or an anti-inflammatory effect. Consistent with the above statement on potential anti- and pro-inflammatory roles of STATS activation, greater median pSTAT3 expression by regulatory phenotype CD25$^+$ B cells in uninflamed tissues was found, which may indicate a protective role for these cells in CD. Overall, activated and antigen-driven T and B cell responses as well as pSTAT3 expression and NK cell expansion were associated with tissue inflammation in CD, which is consistent with trends identified earlier in blood. However, no significant differences were found between inflamed and uninflamed UC tissues, highlighting differences between CD and UC tissues. Alternatively, these findings might also be due to smaller sample sizes and the relatively mild disease of UC patients in cohort 2.

Blood Based Signatures Classify IBD Patients

Figure 5A:
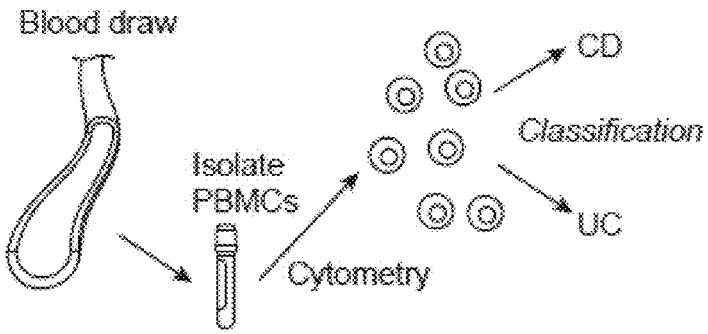
FIGS. 5A-5B depict a schematic of a classification approach and models of eight parameters for CD and UC samples.
Figure 5B:
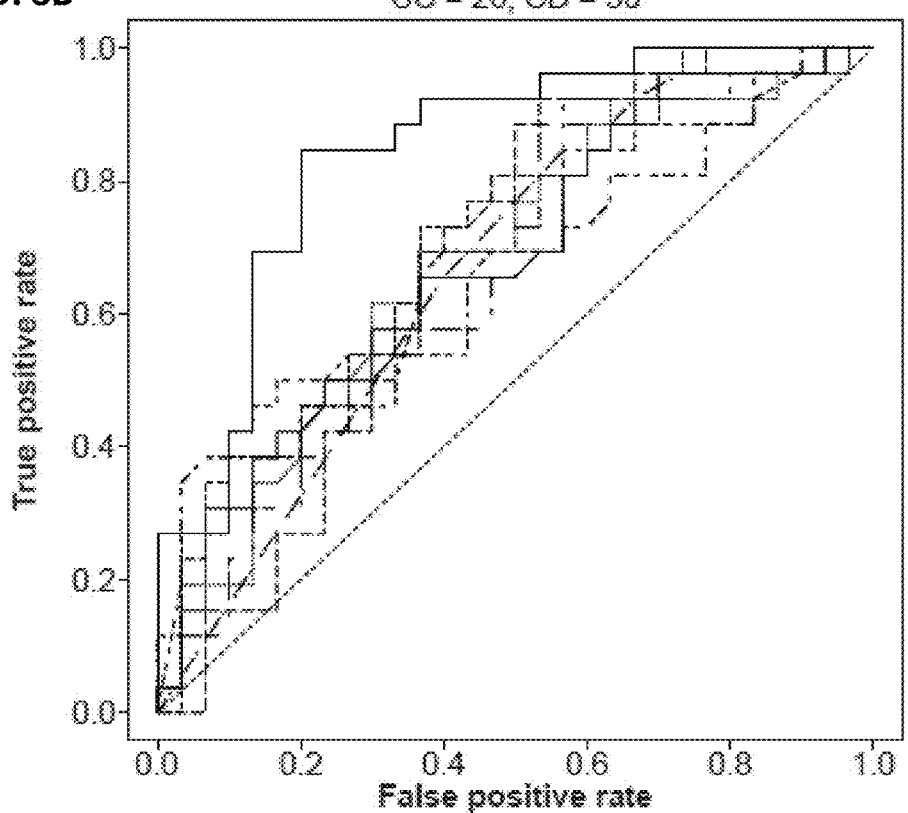

A goal was to utilize differences identified between CD and UC patients for classification of samples as either CD or UC based on cellular markers in a manner that could potentially be used as a non-invasive diagnostic to reduce the required frequency of endoscopy (FIG. 5 A). As expected, unbiased approaches for biomarker discovery, such as CITRUS analysis using SAM, PAMR, or LASSO/GLMNET algorithms, did not produce robust results because dividing cohorts into cross validation folds reduced disease group sample sizes. Thus, generalized linear models (GLMs) were constructed using blood-based signatures of disease that were identified throughout the study to classify patients into one of two disease groups (CD versus UC). Using the eight blood features identified as significantly different between all CD and UC samples in cohort 1 (FIG. 1 C; FIG. 1 D), a GLM was created to classify patients as either CD or UC (FIG. 5 B). Discriminatory performance of the GLM was assessed using receiver operating characteristic (ROC) analysis, in which the true positive rate (sensitivity) is plotted versus the false positive rate (100-specificity). The area under the curve (AUC) reflects the probability that the model will rank a randomly chosen positive (CD) sample higher than a randomly chosen negative (UC) sample. This approach revealed an AUC of 0.845 (95% CI, 0.742-0.948) when using the model with all eight signatures combined to discriminate CD from UC amongst all blood samples in the study, which was higher than any single signature model (FIG. 5 B). A cutoff of 0.4874743 for the model identified with the Youden index method to maximize sensitivity and specificity (see Methods) yielded a sensitivity of 0.80 and a specificity of 0.85 (PPV=0.86, NPV=0.79).

Multivariate analysis was performed to determine if subject characteristics confounded the eight parameters utilized for classification of CD and UC. To demonstrate that subject age and sex did not confound the classification paradigm, analysis of covariance (ANCOVA) was used to assess the interaction between age, sex, or age and sex with each of the eight parameters as the dependent variable. There were no significant interactions for cohort 1 or 2. Thus, it was unnecessary to adjust the data based on age or sex, and we did not include these in the classification model.

CD and UC patients are treated with many different medications, often as combination therapies. Most patients in this study were on a combination of multiple therapies with distinct mechanisms of action. A goal was to determine whether or not medications confounded the GLM or the eight parameters utilized for classification of CD and UC. There was no standard method to correct for medications as confounding factors in the context of the sample sizes and the numerous combination and single therapy regimens. Thus, subjects on and not on each therapy were stratified, and the performance of the eight parameter classification model built using all samples was reevaluated. The most common medications across diseases were TNF antagonists, glucocorticoids, 5-aminosalicylates (5-ASA), and 6-mercaptopurines (6-MP). Methotrexate was used for a small number of subjects as a therapy for preventing immunogenicity of a biologic therapy rather than a primary therapeutic agent to treat the disease. IL-12/23 and $\alpha4\beta7$ antagonists were used for three and four subjects, respectively. The same GLM presented in FIG. 5 B was used to demonstrate that stratification by each common primary therapy (TNF antagonists, glucocorticoids, 5-ASA, and 6-MP) had a negligible effect on model performance Since discrimination between CD and UC with each medication was close to that for subjects not on each corresponding medication, it was unnecessary to adjust for medications in the classification model. This is ideal for future use to monitor patients on diverse treatment regimens encountered in the clinic.

Figure 7:
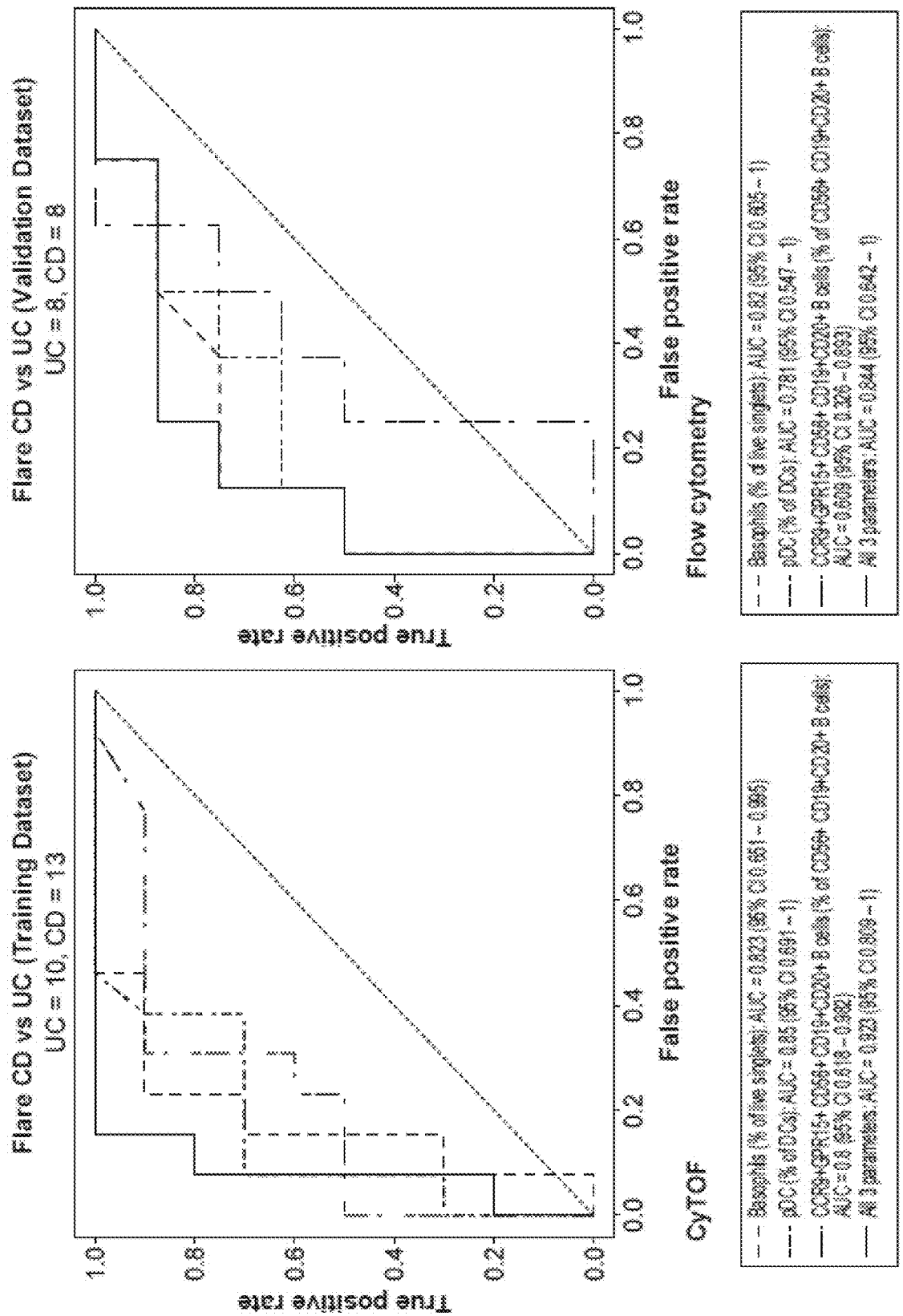
FIG. 7 depicts a model using three blood parameters to classify CD and UC samples from patients with active disease. Blood was drawn from study subjects, peripheral blood mononuclear cells (PBMCs) were isolated and cryopreserved, and samples were analyzed in batches by CyTOF (training dataset) or flow cytometry (validation dataset). Generalized linear models (GLMs) were created for three of the eight parameters significantly different between all CD and UC samples. A cutoff was chosen based on the Youden index method, model parameters and coefficients were fixed, and the model was used to classify samples from the validation dataset. Corresponding receiver operating characteristic (ROC) curves are shown for single feature and three feature models. Samples from patients with active disease in cohort 1 were used as a training dataset from CyTOF data, and samples from patients with active disease from a new cohort were used as an independent validation dataset generated by fluorescence-based flow cytometry to plot ROC curves. UC was used as baseline for the purposes of the GLMs, such that a true positive indicates correct classification of a CD sample. Statistics: generalized linear models were constructed using glm in R.

A modified CD vs. UC classification model was developed for the patients with active disease flares, which is the most important and useful clinical problem to address. Blood was drawn from study subjects, peripheral blood mononuclear cells (PBMCs) were isolated and cryopreserved, and samples were analyzed in batches by CyTOF (training dataset) or flow cytometry (validation dataset). Generalized linear models (GLMs) were created for three of eight total parameters significantly different between samples from individuals with active CD or UC based on the training dataset, to address the largest unmet clinical need for diagnosing patients with active disease. A cutoff was chosen based on the Youden index method, model parameters and coefficients were fixed, and the model was used to classify samples from the validation dataset. Samples from patients with active disease in cohort 1 were used as a training dataset from CyTOF data, and samples from patients with active disease from a new cohort were used as an independent validation dataset generated by fluorescence-based flow cytometry to plot ROC curves. The model is based upon only 3 parameters (of the 8 initially identified) that can all be measured in 1 clinical flow cytometry panel, which was validated with an independent cohort of patients by fluorescence-based flow cytometry (FIG. 7). These three parameters can be measured using a 8-10 color clinical flow cytometry panel using PBMCs from one tube of blood for non-invasive monitoring of disease. This improved model for classification of CD vs. UC flare patients has significant potential for addressing unmet clinical needs for faster, cheaper, and more accurate/conclusive differentiation of Crohn's disease and ulcerative colitis. In UC, surgery can be curative, but surgery is associated with worse outcomes for CD patients, so it is important to have a definitive diagnosis when considering treatments and interventions for patients with active disease. Since treatments and interventions are often delayed until after colonoscopy and histologic analysis to determine the diagnosis, these blood markers could allow earlier diagnosis and thus earlier intervention and treatment, which is associated with better outcomes.

Discussion

Cellular signatures and phenotypes associated with clinical subsets of IBD, highlighting gut tropic leukocytes, were identified. See the table below for intercepts and coefficients of each parameter in the generalized linear models:

| All CD vs UC (training dataset) | |
| --- | --- |
| Intercept | −0.3587230 |
| Basophils (% of live singlets) | −1.0432548 |
| pDC (% of DCs) | 0.2258415 |
| Effector memory CD4 T cells (median pCREB) | −0.5494137 |
| Basophils (median pCREB) | −0.3559057 |
| CCR9 + GPR15 + CD56 + CD19 + CD20 + B cells (% of CD56 + CD19 + CD20 + B cells) | −0.6370560 |
| $\alpha4\beta7$ + CCR1 + CD56 + plasmablasts (% of CD56 + plasmablasts) | −0.7015127 |
| $\alpha4\beta7$ + mDCs (% of mDCs) | −0.2405979 |
| IgD − CD27 − B cells (% of CD19 + CD20 + B cells) | 0.7702076 |

The mass cytometry approach allowed the measurement of numerous relevant parameters on single cells from individuals with IBD. Specifically, a novel panel was designed to enrich for gut tropic leukocytes, identify their lineages, and characterize their functional significance. The study utilized a broad cohort of human IBD patients and presented significant findings that relate peripheral and tissue immune responses across distinct disease states. Moreover, gut tropic cell populations revealed potential blood-tissue correlates and localization patterns of pathogenic cells. Greater heterogeneity amongst samples from CD patients compared to UC patients was observed, and corresponding cellular phenotypes were elucidated. These signatures were detected in the blood, which validates their use as non-invasive, cost-effective, and safe biomarkers for disease diagnosis and monitoring. The high accuracy of the model for classification of CD versus UC is particularly encouraging. Since this classification of CD versus UC was accomplished entirely based on blood in a non-invasive manner, the approach may be useful for disease diagnosis and after further validation to help reduce the required frequency of endoscopy, which comes with associated risks that can impact patient quality of life and health.

Prior knowledge of leukocyte trafficking in the field is for the most part based on animal studies, and the study demonstrates clinical significance and opportunities for further translational development of these molecules. The decrease in gut tropic cells that were observed in UC flare compared to remission and HC (FIG. 1 G; FIG. 1 H) might indicate an increase in trafficking or tissue localization, which could explain why UC patients often respond better to the $\alpha4\beta7$ antagonist vedolizumab.

The findings are consistent with reports of distinct responses in circulation and tissue as well as the importance of CD4+ T cells in CD[48]. However, additional leukocyte populations were found, many accessible in the blood, that reflected disease group distinctions. Although disease-specific leukocytes reside mostly in the affected tissues[48], by using gut-trafficking molecules disease-specific leukocytes in circulation were enriched for and their utility in defining disease classification, activity, and behavior was shown. While a previous CyTOF-based study focused on samples from patients with celiac disease and only included 10 samples from patients with CD[48], the study here utilized larger cohorts of IBD patients with detailed clinical, endoscopic, and imaging annotations to subset patients into not only disease groups but also subsets based on disease phenotype. In addition, the CyTOF panels included surface, trafficking and intracellular antigens that were highlighted by the differential expression patterns observed, including many gut tropic cell populations.

Distinct signatures of disease diagnosis (CD vs. UC), disease states (flare vs. remission), and clinical subsets (disease phenotype—behavior, location, etc.) within CD and UC were uncovered. The STAT3 and CREB signatures that were identified in CD suggest important signatures of disease that may be relevant for diagnosis, better understanding pathogenesis, and response to therapy. Elevated pSTAT3 in CD tissue Tph cells (FIG. 3 D) is consistent with the increase in B cell subsets in CD, since pSTAT3 is downstream of IL-6 and IL-21 signaling, which are produced by T helper cells and contribute to B cell activation[34]. Moreover, the prevalence of pSTAT3 signatures across cell subsets elevated in CD (FIGS. 4 B and 4 C) suggests pSTAT3 as a marker of disease and/or pathogenesis in the CD patients studied here. STAT3 is also a key signaling molecule in the IL-23/Th17 pathway, which was identified in GWAS studies of both CD and UC, plays an important role in IBD pathogenesis, and is the target of new biologic therapeutics[3,49].

pSTAT3 was also identified in CD25+ regulatory B cells, which was elevated in uninflamed CD tissue compared to paired inflamed areas of the same gastrointestinal region (FIG. 4 E). While there is debate in the field about the role of human CD25+ regulatory B cells, they have been shown to attenuate disease severity in animal models of colitis, suppress human CD4+ T cell proliferation, and enhance CTLA-4 expression by Tregs[50]. Moreover, the findings are consistent with data that demonstrate regulatory B cell functions dependent on anti-inflammatory cytokines (IL-10 and TGF-β) upstream of pSTAT3[51,52]. Based on these reports, the increased pSTAT3 in regulatory B cells observed in uninflamed as compared to inflamed tissue sites might suggest a protective role for these cells in CD. Future studies of paired blood and tissue that include healthy controls will determine whether uninflamed tissue is phenotypically and functionally normal or represents subclinical disease processes underway.

Several gut tropic CD45RO+ B cell subsets were elevated in inflamed CD compared to UC tissue (FIG. 4 C). CD45RO+ B cells were previously described in the blood and tissue as a potential biomarker for CD, which correlated with CD activity index (CDAI)[43] and intestinal permeability[42]. Expression of CD45RO by B cells is associated with late stage B cell differentiation and antigen stimulation[43], as well as activation and immunoglobulin variable region gene mutation[53], suggesting a potential mechanism for antigen-driven B cell responses in CD distinct from antigen-driven IgD−CD27− B cells identified in the circulation of UC patients. Demonstrating the relevance of B cell subsets for understanding the pathophysiology of inflammatory bowel diseases represents a significant development in the field.

One potential limitation associated with the analysis of flare and remission disease states is that patients in clinical remission may still have some subclinical active disease processes occurring, although this mirrors clinical patient management. The analysis used IBD specialist defined flare and remission for patients based on clinical criteria utilized for standard of care with intent to treat at the time of sample collection, although there was a spectrum of quantitative disease activities and phenotypes for each group. Some cohort 2 subjects in clinical remission exhibited histologic features of mild disease activity and might not fit deep remission states. The identification of distinct signatures between CD and UC patients even in remission suggests that while flares of either disease might respond to similar therapies as evidenced by their clinical utility, different maintenance therapies might be necessary for subsets of patients.

Consistent with clinical observations, greater cellular heterogeneity amongst CD compared to UC was observed. Blood signatures could be used as non-invasive, cost-effective, and safe markers for disease diagnosis and monitoring. Although the classification model could be over specified and there exist cellular features not tested here, these limitations do not interfere with its potential utility.

Since the vast majority of patients in academic and/or tertiary centers are not treatment naive, the breadth of drug regimens represented here reflects the reality encountered. Ongoing studies address limitations of the present work and focus on evaluating disease classification models in larger and more diverse independent cohorts, including HC samples and additional disease comparators, and track individuals longitudinally to examine phenotype stability over time.

REFERENCES

1. Molodecky, N. A., et al. Increasing incidence and prevalence of the inflammatory bowel diseases with time, based on systematic review. *Gastroenterology* 142, 46-54 e42; quiz e30 (2012).
2. Abraham, C. & Cho, J. H. Inflammatory bowel disease. *N Engl J Med* 361, 2066-2078 (2009).
3. Bilsborough, J., Targan, S. R. & Snapper, S. B. Therapeutic Targets in Inflammatory Bowel Disease: Current and Future. *Am J Gastroenterol Suppl* 3, 27-37 (2016).
4. Ananthakrishnan, A. N. Epidemiology and risk factors for IBD. *Nat Rev Gastroenterol Hepatol* 12, 205-217 (2015).
5. Marsal, J. & Agace, W. W. Targeting T-cell migration in inflammatory bowel disease. *J Intern Med* 272, 411-429 (2012).
6. Gasche, C., et al. A simple classification of Crohn's disease: report of the Working Party for the World Congresses of Gastroenterology, Vienna 1998. *Inflamm Bowel Dis* 6, 8-15 (2000).
7. Safar, B. & Sands, D. Perianal Crohn's disease. *Clin Colon Rectal Surg* 20, 282-293 (2007).
8. Silverberg, M. S., et al. Toward an integrated clinical, molecular and serological classification of inflammatory bowel disease: report of a Working Party of the 2005 Montreal World Congress of Gastroenterology. *Can J Gastroenterol* 19 Suppl A, 5A-36A (2005).
9. Satsangi, J., Silverberg, M. S., Vermeire, S. & Colombel, J. F. The Montreal classification of inflammatory bowel disease: controversies, consensus, and implications. *Gut* 55, 749-753 (2006).

10. Yantiss, R. K. & Odze, R. D. Diagnostic difficulties in inflammatory bowel disease pathology. *Histopathology* 48, 116-132 (2006).
11. McGovern, V. J. & Goulston, S. J. Crohn's disease of the colon. *Gut* 9, 164-176 (1968).
12. Islam, S. A. & Luster, A. D. T cell homing to epithelial barriers in allergic disease. *Nat Med* 18, 705-715 (2012).
13. Habtezion, A., Nguyen, L. P., Hadeiba, H. & Butcher, E. C. Leukocyte Trafficking to the Small Intestine and Colon. *Gastroenterology* 150, 340-354 (2016).
14. Bendall, S. C., Nolan, G. P., Roederer, M. & Chattopadhyay, P. K. A deep profiler's guide to cytometry. *Trends Immunol* 33, 323-332 (2012).
15. Dobre, M., et al. Mucosal CCR1 gene expression as a marker of molecular activity in Crohn's disease: preliminary data. *Rom J Morphol Embryol* 58, 1263-1268 (2017).
16. McGovern, D. P., Kugathasan, S. & Cho, J. H. Genetics of Inflammatory Bowel Diseases. *Gastroenterology* 149, 1163-1176 e1162 (2015).
17. Kim, S. V., et al. GPR15-mediated homing controls immune homeostasis in the large intestine mucosa. *Science* 340, 1456-1459 (2013).
18. Nguyen, L. P., et al. Role and species-specific expression of colon T cell homing receptor GPR15 in colitis. *Nat Immunol* 16, 207-213 (2015).
19. Morrison, R. W. & De Jong, K. A. Measurement of Population Diversity. *Artificial Evolution* 2310, 31-41 (2002).
20. Muroi, K., et al. CD56 expression in B-cell lymphoma. *Leuk Res* 22, 201-202 (1998).
21. Van Acker, H. H., Capsomidis, A., Smits, E. L. & Van Tendeloo, V. F. CD56 in the Immune System: More Than a Marker for Cytotoxicity? *Front Immunol* 8, 892 (2017).
22. Brand, S. Crohn's disease: Th1, Th17 or both? The change of a paradigm: new immunological and genetic insights implicate Th17 cells in the pathogenesis of Crohn's disease. *Gut* 58, 1152-1167 (2009).
23. Vallania, F., et al. Leveraging heterogeneity across multiple data sets increases accuracy of cell-mixture deconvolution and reduces biological and technical biases. *bioRxiv* (2017).
24. Qiao, Y. Q., et al. LncRNA DQ786243 affects Treg related CREB and Foxp3 expression in Crohn's disease. *J Biomed Sci* 20, 87 (2013).
25. Wu, Y. C., Kipling, D. & Dunn-Walters, D. K. The relationship between CD27 negative and positive B cell populations in human peripheral blood. *Front Immunol* 2, 81 (2011).
26. Fecteau, J. F., Cote, G. & Neron, S. A new memory CD27-IgG+ B cell population in peripheral blood expressing VH genes with low frequency of somatic mutation. *J Immunol* 177, 3728-3736 (2006).
27. Fleischer, S. J., et al. Increased frequency of a unique spleen tyrosine kinase bright memory B cell population in systemic lupus erythematosus. *Arthritis Rheumatol* 66, 3424-3435 (2014).
28. Wei, C., et al. A new population of cells lacking expression of CD27 represents a notable component of the B cell memory compartment in systemic lupus erythematosus. *J Immunol* 178, 6624-6633 (2007).
29. Moir, S., et al. Evidence for HIV-associated B cell exhaustion in a dysfunctional memory B cell compartment in HIV-infected viremic individuals. *J Exp Med* 205, 1797-1805 (2008).
30. Rojas, O. L., Narvaez, C. F., Greenberg, H. B., Angel, J. & Franco, M. A. Characterization of rotavirus specific B cells and their relation with serological memory. *Virology* 380, 234-242 (2008).
31. Mills, S. & Stamos, M. J. Colonic Crohn's disease. *Clin Colon Rectal Surg* 20, 309-313 (2007).
32. Frizelle, F. A. & Burt, M. J. Review: the surgical management of ulcerative colitis. *J Gastroenterol Hepatol* 12, 670-677 (1997).
33. Hedrick, T. L. & Friel, C. M. Colonic crohn disease. *Clin Colon Rectal Surg* 26, 84-89 (2013).
34. Rao, D. A., et al. Pathologically expanded peripheral T helper cell subset drives B cells in rheumatoid arthritis. *Nature* 542, 110-114 (2017).
35. Wang, X., et al. Cyclic AMP-Responsive Element-Binding Protein (CREB) is Critical in Autoimmunity by Promoting Th17 but Inhibiting Treg Cell Differentiation. *EBioMedicine* 25, 165-174 (2017).
36. Egwuagu, C. E. STATS in CD4+ T helper cell differentiation and inflammatory diseases. *Cytokine* 47, 149-156 (2009).
37. Galvez, J. Role of Th17 Cells in the Pathogenesis of Human IBD. *ISRN Inflamm* 2014, 928461 (2014).
38. Jaimes, M. C., et al. Maturation and trafficking markers on rotavirus-specific B cells during acute infection and convalescence in children. *J Virol* 78, 10967-10976 (2004).
39. Wang, W., et al. Identification of a novel chemokine (CCL28), which binds CCR10 (GPR2). *J Biol Chem* 275, 22313-22323 (2000).
40. Trivedi, P. J., et al. Intestinal CCL25 expression is increased in colitis and correlates with inflammatory activity. *J Autoimmun* 68, 98-104 (2016).
41. Bekker, P., et al. CCR9 Antagonists in the Treatment of Ulcerative Colitis. *Mediators Inflamm* 2015, 628340 (2015).
42. Yacyshyn, B. R. & Meddings, J. B. CD45RO expression on circulating CD19+ B cells in Crohn's disease correlates with intestinal permeability. *Gastroenterology* 108, 132-137 (1995).
43. Yacyshyn, B. R. & Pilarski, L. M. Expression of CD45RO on circulating CD19+ B-cells in Crohn's disease. *Gut* 34, 1698-1704 (1993).
44. Nguyen, P. M., Putoczki, T. L. & Ernst, M. STAT3-Activating Cytokines: A Therapeutic Opportunity for Inflammatory Bowel Disease? *J Interferon Cytokine Res* 35, 340-350 (2015).
45. Pickert, G., et al. STAT3 links IL-22 signaling in intestinal epithelial cells to mucosal wound healing. *J Exp Med* 206, 1465-1472 (2009).
46. Feagan, B. G., et al. Vedolizumab as induction and maintenance therapy for ulcerative colitis. *N Engl J Med* 369, 699-710 (2013).
47. Sandborn, W. J., et al. Vedolizumab as induction and maintenance therapy for Crohn's disease. *N Engl J Med* 369, 711-721 (2013).
48. van Unen, V., et al. Mass Cytometry of the Human Mucosal Immune System Identifies Tissue- and Disease-Associated Immune Subsets. *Immunity* 44, 1227-1239 (2016).
49. Lees, C. W., Barrett, J. C., Parkes, M. & Satsangi, J. New IBD genetics: common pathways with other diseases. *Gut* 60, 1739-1753 (2011).
50. Kessel, A., et al. Human CD19(+)CD25(high) B regulatory cells suppress proliferation of CD4(+) T cells and enhance Foxp3 and CTLA-4 expression in T-regulatory cells. *Autoimmun Rev* 11, 670-677 (2012).

51. Vadasz, Z., Haj, T., Kessel, A. & Toubi, E. B-regulatory cells in autoimmunity and immune mediated inflammation. *FEBS Lett* 587, 2074-2078 (2013).
52. Bing, X., Linlang, L. & Keyan, C. Decreased Breg/Th17 Ratio Improved the Prognosis of Patients with Ulcerative Colitis. *Can J Gastroenterol Hepatol* 2018, U.S. Pat. No. 5,760,849 (2018).
53. Jackson, S. M., et al. CD45RO enriches for activated, highly mutated human germinal center B cells. *Blood* 110, 3917-3925 (2007).
54. Fernandez, R. & Maecker, H. Cytokine-stimulated Phosphoflow of PBMC Using CyTOF Mass Cytometry. *Bio Protoc* 5 (2015).
55. Samusik, N., Good, Z., Spitzer, M. H., Davis, K. L. & Nolan, G. P. Automated mapping of phenotype space with single-cell data. *Nat Methods* 13, 493-496 (2016).
56. Newman, A. M., et al. Robust enumeration of cell subsets from tissue expression profiles. *Nat Methods* 12, 453-457 (2015).
57. Haynes, W. A., et al. Empowering Multi-Cohort Gene Expression Analysis to Increase Reproducibility. *Pac Symp Biocomput* 22, 144-153 (2017).
58. Rubin, S. J. S., Bai, L., Haileselassie, Y., Garay, G., Yun, C., Becker, L., Streett, S. E., Sinha, S. R. & Habtezion, A. Mass cytometry reveals distinct systemic and local immune signatures of inflammatory bowel diseases. *Nature Communications,* 10, 2686 (2019).

Supplemental Analysis

8 Parameter Model

One goal of this analysis was to utilize differences identified between Crohn's disease (CD) and ulcerative colitis (UC) patients for classification of samples as either CD or UC based on cellular markers in a manner that could potentially be used as a non-invasive diagnostic to reduce the required frequency of endoscopy. Generalized linear models (GLMs) were constructed using blood-based signatures of disease measured by mass cytometry (CyTOF) and identified throughout the study to classify patients into one of two disease groups (CD versus UC). Using the eight blood features identified as significantly different between all CD and UC samples in cohort 1, a GLM was created to classify all patients as either CD or UC (FIG. 5 B).

The approximate number of markers required to measure these 8 parameters by flow cytometry is 16, including CD123, HLA-DR, pCREB, CD11c, α4β7, CD19, CD20, IgD, CD27, CD4, CD45RO, CCR9, GPR15, CD56, CCR1, and CD38, or in some cases up to 20 markers, including the aforementioned markers plus CD14, and/or CD3, and/or CD8, and/or live/dead stain. Some of the panels derived from these markers may be accommodated by clinical fluorescence-based flow cytometers and other cytometry instruments.

Additional Analysis to Identify Simplified Models

Next, a goal was to determine the minimal number of parameters required for constructing a model with equivalent performance when classifying CD vs. UC. Reducing the number of parameters thus reduces the number of required cytometric markers to be accommodated by clinical flow cytometers, which allows for more widespread implementation of the model for non-invasive and accurate classification of CD and UC. Furthermore, removing pCREB from the panel of required markers eliminates the cell permeabilization step when staining cells for cytometric analysis, since all of the remaining markers are detectable on the cell surface. This greatly simplifies the process.

6 Parameter Model

Removing the two pCREB parameters (pCREB in effector memory CD4 T cells and pCREB in basophils) from the 8 parameter model yielded a 6 parameter model with similar performance. The approximate number of markers required to measure these 6 parameters by flow cytometry is 13, including CD123, HLA-DR, CD11c, α4β7, CD19, CD20, IgD, CD27, CCR9, GPR15, CD56, CCR1, and CD38, or in some cases up to 15 markers, including the aforementioned markers plus CD14, and/or live/dead stain. Panels derived from these markers are likely accommodated by clinical fluorescence-based flow cytometers and other cytometry instruments.

5 Parameter Models

Removing 1 parameter (either CCR9+GPR15+ CD56+ CD19+CD20+ B cells as % of CD56+ CD19+CD20+ B cells, or α4β7+CCR1+ CD56+ plasmablasts as % of CD56+ plasmablasts, or α4β7+ mDCs as % of mDCs) from the 6 parameter model yielded three different 5 parameter models with similar performance. The approximate number of markers required to measure the 5 parameter model without CCR9+GPR15+ CD56+ CD19+CD20+ B cells as % of CD56+ CD19+CD20+ B cells by flow cytometry is 11, including CD123, HLA-DR, CD11c, α4β7, CD19, CD20, IgD, CD27, CD56, CCR1, and CD38 or in some cases up to 13 markers, including the aforementioned markers plus CD14, and/or live/dead stain. The approximate number of markers required to measure the 5 parameter model without α4β7+CCR1+ CD56+ plasmablasts as % of CD56+ plasmablasts by flow cytometry is 11, including CD123, HLA-DR, CD11c, α4β7, CD19, CD20, IgD, CD27, CCR9, GPR15, and CD56 or in some cases up to 13 markers, including the aforementioned markers plus CD14, and/or live/dead stain. The approximate number of markers required to measure the 5 parameter model without α4β7+ mDCs as % of mDCs by flow cytometry is 13, including CD123, HLA-DR, CD11c, α4β7, CD19, CD20, IgD, CD27, CCR9, GPR15, CD56, CCR1, and CD38 or in some cases up to 15 markers, including the aforementioned markers plus CD14, and/or live/dead stain. Panels derived from these markers are likely accommodated by clinical fluorescence-based flow cytometers and other cytometry instruments.

4 Parameter Model

Removing 2 parameters (CCR9+GPR15+ CD56+ CD19+CD20+ B cells as % of CD56+ CD19+CD20+ B cells and α4β7+ mDCs as % of mDCs) from the 6 parameter model yielded a 4 parameter model with similar performance. The approximate number of markers required to measure these 4 parameters by flow cytometry is 10, including CD123, HLA-DR, CD11c, CD19, CD20, IgD, CD27, CCR9, GPR15, CD56, or in some cases up to 12 markers, including the aforementioned markers plus CD14, and/or live/dead stain. Panels derived from these markers are likely accommodated by clinical fluorescence-based flow cytometers and other cytometry instruments.

3 Parameter Model

Removing the two intracellular pCREB parameters (pCREB in effector memory CD4 T cells and pCREB in basophils) as well as three surface parameters (α4β7+ CCR1+ CD56+ plasmablasts as % of CD56+ plasmablasts, α4β7+ mDCs as % of mDCs, and IgD-CD27– B cells as % of CD19+ CD20+ B cells) from the 8 parameter model yielded a 3 parameter model with similar performance on samples from patients with active disease (FIG. 7). The approximate number of markers required to measure these three parameters by flow cytometry is 8, including CD123, CD11c, HLA-DR, CD19, CD20, CD56, CCR9, and GPR15, or in some cases up to 9 or 10 markers, including the aforementioned markers plus CD14, and/or live/dead stain. Panels derived from these markers are likely accommodated by clinical fluorescence-based flow cytometers and other cytometry instruments.

Summary

The 8 and 3 parameter models appear most promising based on their performance, simplicity and broad applicability, although other models may be superior for certain patient populations or other conditions.

That which claimed is:

1. A method of treatment, comprising:
   (a) labeling peripheral blood leukocytes isolated from a patient that has or is suspected of having inflammatory bowel disease (IBD) with a panel of fewer than 20 antibodies, wherein the antibodies bind to CD123, HLA-DR, CD11c, CD19, CD20, CCR9, GPR15 and CD56, and, optionally, IgD and CD27, and wherein the antibodies are each conjugated to a label and the labels conjugated to the antibodies distinguish the antibodies from one another;
   (b) analyzing binding of the antibodies to the peripheral blood leukocytes;
   (c) identifying the patient as having Crohn's disease or ulcerative colitis based on the analysis of (b), wherein the identifying comprises:
      (i) gating immune cells based on the expression of CD123, HLA-DR, CD11c, CD19, CD20, CCR9, GPR15 and CD56, and, optionally, IgD and CD27;
      (ii) inputting the results of (i) into a probability model; and
      (iii) determining a probability of the patient having Crohn's disease or ulcerative colitis based on the results of (ii); and
   (d) treating the patient with surgery of the intestine and/or an immunosuppressive agent.

2. The method of claim 1, wherein the analysis of (b) is done by cytometry.

3. The method of claim 1, wherein the antibodies are fluorescently labeled and the analysis of (b) is done by flow cytometry.

4. The method of claim 1, wherein the antibodies are mass-tagged, and the analysis of (b) is done by mass cytometry.

5. The method of claim 1, wherein the antibodies are tethered to oligonucleotides and the analysis of (b) is done by sequencing the oligonucleotides that are tethered to the antibodies bound to the peripheral blood leukocytes.

6. The method of claim 1, wherein the panel further comprises a distinguishably labeled antibody that binds to CD14 and/or a stain that distinguishes live cells from dead cells.

7. The method of claim 1, wherein the method comprises (c) independently calculating two or more of:
   (i) the percentage of all cells or all live single cells that are basophils;
   (ii) the percentage of all dendritic cells (DCs) that are plasmacytoid dendritic cells (pDCs);
   (iii) the percentage of all CD19$^+$CD20$^+$cells that are IgD$^-$CD27$^-$; and
   (iv) the percentage of all CD56$^+$CD19$^+$CD20$^+$cells that are CCR9$^+$GPR15$^+$.

8. The method of claim 7, further comprising providing a report indicating the percentages of (i)-(iv) or a subset of these percentages.

9. The method of claim 8, comprising comparing the percentages of (i)-(iv) or a subset of these percentages to reference values.

10. The method of claim 1, wherein the method comprises:
    analyzing the binding of antibodies to CD123, CD11c, HLA-DR, CD19, CD20, CD56, CCR9, GPR15, and, optionally, CD14 on the cells in the presence or absence of a live/dead stain;
    analyzing the binding of antibodies to CD123, HLA-DR, CD11c, α4β7, CD19, CD20, IgD, CD27, CCR9, GPR15, CD56, and optionally, CD14 on the cells in the presence or absence of a live/dead stain;
    analyzing the binding of antibodies to CD123, HLA-DR, CD11c, α4β7, CD19, CD20, IgD, CD27, CCR9, GPR15, CD56, CCR1, CD38, and optionally, CD14 on the cells in the presence or absence of a live/dead stain; or
    analyzing the binding of antibodies to CD123, HLA-DR, pCREB, CD11c, α4β7, CD19, CD20, IgD, CD27, CD4, CD45RO, CCR9, GPR15, CD56, CCR1, CD38, and optionally, CD14, and/or CD3, and/or CD8 to the cells in or the presence or absence of a live/dead stain.

11. A kit comprising antibodies that bind to CD123, HLA-DR, CD11c, CD19, CD20, CCR9, GPR15 and CD56, wherein the kit comprises fewer than 20 antibodies.

12. The kit of claim 11, further comprising an antibody that binds to CD14.

13. The kit of claim 11, further comprising stain that distinguishes live cells from dead cells.

14. The kit of claim 11, wherein the antibodies are each conjugated to a label and the labels conjugated to the antibodies distinguish the antibodies from one another.

15. The kit of claim 11, wherein the kit comprises antibodies that bind to
    CD123, CD11c, HLA-DR, CD19, CD20, CD56, CCR9, GPR15, and, optionally, CD14 and/or a live/dead stain;
    CD123, HLA-DR, CD11c, CD19, CD20, IgD, CD27, CCR9, GPR15 and CD56, and, optionally, CD14 and/or a live/dead stain;
    CD123, HLA-DR, CD11c, α4β7, CD19, CD20, IgD, CD27, CCR9, GPR15, CD56, and, optionally, CD14 and/or a live/dead stain;
    CD123, HLA-DR, CD11c, α4β7, CD19, CD20, IgD, CD27, CCR9, GPR15, CD56, CCR1, CD38, and, optionally, CD14 and/or a live/dead stain; or
    CD123, HLA-DR, pCREB, CD11c, α4β7, CD19, CD20, IgD, CD27, CD4, CD45RO, CCR9, GPR15, CD56, CCR1, CD38, and optionally, CD14, and/or CD3, and/or CD8 and/or a live/dead stain.

16. The kit of claim 11, wherein the kit comprises fewer than 15 antibodies.

17. The kit of claim 11, wherein the kit comprises up to 11 antibodies.

18. The kit of claim 11, wherein the antibodies are each conjugated to a fluorescent label, wherein the fluorescent labels distinguish the antibodies from one another.

19. The kit of claim 11, wherein the antibodies are in separate containers.

20. The kit of claim 11, wherein at least two of the antibodies are in the same container.

* * * * *